(12) United States Patent
Troberg et al.

(10) Patent No.: US 9,496,925 B2
(45) Date of Patent: Nov. 15, 2016

(54) METHOD, APPARATUS, AND COMPUTER PROGRAM PRODUCT FOR REMOTE WIRELESS POWERING AND CONTROL OF AN ELECTRONIC DEVICE

(75) Inventors: Mikael Johannes Troberg, Salo (FI); Kristian Mikael Vaajala, Lieto (FI); Juhani Valdemar Kari, Lieto (FI)

(73) Assignee: Nokia Technologies Oy, Espoo (FI)

( * ) Notice: Subject to any disclaimer, the term of this patent is extended or adjusted under 35 U.S.C. 154(b) by 1034 days.

(21) Appl. No.: 13/249,676

(22) Filed: Sep. 30, 2011

(65) Prior Publication Data

US 2013/0084800 A1  Apr. 4, 2013

(51) Int. Cl.
*H04B 5/00* (2006.01)
*H02J 5/00* (2016.01)
*H02J 7/02* (2016.01)

(52) U.S. Cl.
CPC ............. *H04B 5/0081* (2013.01); *H02J 5/005* (2013.01); *H02J 7/025* (2013.01); *H04B 5/0037* (2013.01); *H04B 5/0062* (2013.01)

(58) Field of Classification Search
None
See application file for complete search history.

(56) References Cited

U.S. PATENT DOCUMENTS

| | | |
|---|---|---|
| 2002/0091456 A1 | 7/2002 | O'Connor |
| 2002/0147027 A1 | 10/2002 | Alford, Jr. et al. |
| 2005/0125678 A1 | 6/2005 | Shaw et al. |
| 2005/0176465 A1 | 8/2005 | Fornell |
| 2005/0194926 A1 | 9/2005 | DiStefano |
| 2005/0258229 A1 | 11/2005 | Minemura |
| 2006/0113385 A1 | 6/2006 | Chan et al. |
| 2006/0158152 A1 | 7/2006 | Taniguchi et al. |
| 2006/0244568 A1 | 11/2006 | Tong et al. |
| 2007/0253251 A1 | 11/2007 | Mizushima et al. |
| 2008/0162361 A1 | 7/2008 | Sklovsky et al. |
| 2008/0190526 A1 | 8/2008 | O'Shea |
| 2008/0272889 A1* | 11/2008 | Symons ................. 340/10.1 |
| 2009/0075592 A1 | 3/2009 | Nystrom et al. |
| 2009/0111393 A1* | 4/2009 | Scalisi et al. ............. 455/90.1 |
| 2009/0161872 A1 | 6/2009 | O'Brien et al. |
| 2009/0254897 A1* | 10/2009 | Segalov ................. G06F 8/68 717/173 |
| 2009/0295548 A1 | 12/2009 | Ronkka et al. |
| 2010/0041333 A1* | 2/2010 | Ungari ................. H02J 7/00 455/41.2 |
| 2010/0201533 A1 | 8/2010 | Kirby et al. |
| 2010/0281183 A1* | 11/2010 | Van Bebber ......... H02J 7/0054 710/5 |

(Continued)

FOREIGN PATENT DOCUMENTS

| | | |
|---|---|---|
| CN | 1572087 A | 1/2005 |
| CN | 1662882 A | 8/2005 |

(Continued)

OTHER PUBLICATIONS

English Language machine translation of Japanese Patent Publication No. 2007-317170, 21 pp.

(Continued)

*Primary Examiner* — Zhiyu Lu
(74) *Attorney, Agent, or Firm* — Locke Lord LLP

(57) ABSTRACT

Example method, apparatus, and computer program product embodiments are disclosed to enable remote wireless powering and control of an electronic device. Example embodiments of the invention include a method comprising the steps of detecting received power in a wireless power receiver of a device; determining to turn on the device in response to detecting the power; and sending information through a control interface to cause an information processing operation to be performed.

38 Claims, 20 Drawing Sheets

(56) References Cited

U.S. PATENT DOCUMENTS

| | | |
|---|---|---|
| 2011/0057606 A1 | 3/2011 | Saunamaki |
| 2011/0087907 A1 | 4/2011 | Jantunen et al. |

FOREIGN PATENT DOCUMENTS

| | | |
|---|---|---|
| EP | 1437863 A1 | 7/2004 |
| EP | 2221978 | 8/2010 |
| JP | 2001510315 | 7/2001 |
| JP | 2003216450 | 7/2003 |
| JP | 2004118344 | 4/2004 |
| JP | 2004185235 | 7/2004 |
| JP | 2004235713 | 8/2004 |
| JP | 2005056150 | 3/2005 |
| JP | 2005099908 | 4/2005 |
| JP | 2005099909 | 4/2005 |
| JP | 2005269053 | 9/2005 |
| JP | 2005275891 | 10/2005 |
| JP | 2005346611 | 12/2005 |
| JP | 2006025160 | 1/2006 |
| JP | 2006033552 | 2/2006 |
| JP | 2006074588 | 3/2006 |
| JP | 2006085637 | 3/2006 |
| JP | 2006121731 | 5/2006 |
| JP | 2006201959 | 8/2006 |
| JP | 2007-317170 | 12/2007 |
| JP | 2008521287 | 6/2008 |
| WO | 99/03288 A1 | 1/1999 |
| WO | 2004/001589 A2 | 12/2003 |
| WO | 2005/057316 | 6/2005 |
| WO | 2005/114857 A1 | 12/2005 |
| WO | 2006/055431 | 5/2006 |
| WO | WO2007068993 | 6/2007 |
| WO | 2007/084716 | 7/2007 |
| WO | 2007/084717 | 7/2007 |
| WO | WO20100129369 | 11/2010 |

OTHER PUBLICATIONS

Patent Abstracts of Japan corresponding to Japanese Patent Publication No. 2007-317170, Dec. 6, 2007, 1 page.
English Language machine translation of Japanese Patent Publication No. 2005269053, 39 pp.
Patent Abstracts of Japan corresponding to Japanese Patent Publication No. 2005-269053, Sep. 29, 2005, 1 page.
Patent Abstracts of Japan corresponding to Japanese Patent Publication No. 2006-201959, Aug. 3, 2006, 1 page.
International Search Report and Written Opinion completed Feb. 23, 2009 in International Application Serial No. PCT/FI2008/050387.
English Translation of Chinese Office Action issued in Chiense Application No. 200680054161.2, Nov. 24, 2011, pp. 1-12.
Supplementary European Search Report for EP Application No. EP 12 83 5330.7-1852/2761769 dated Apr. 24, 2015.

* cited by examiner

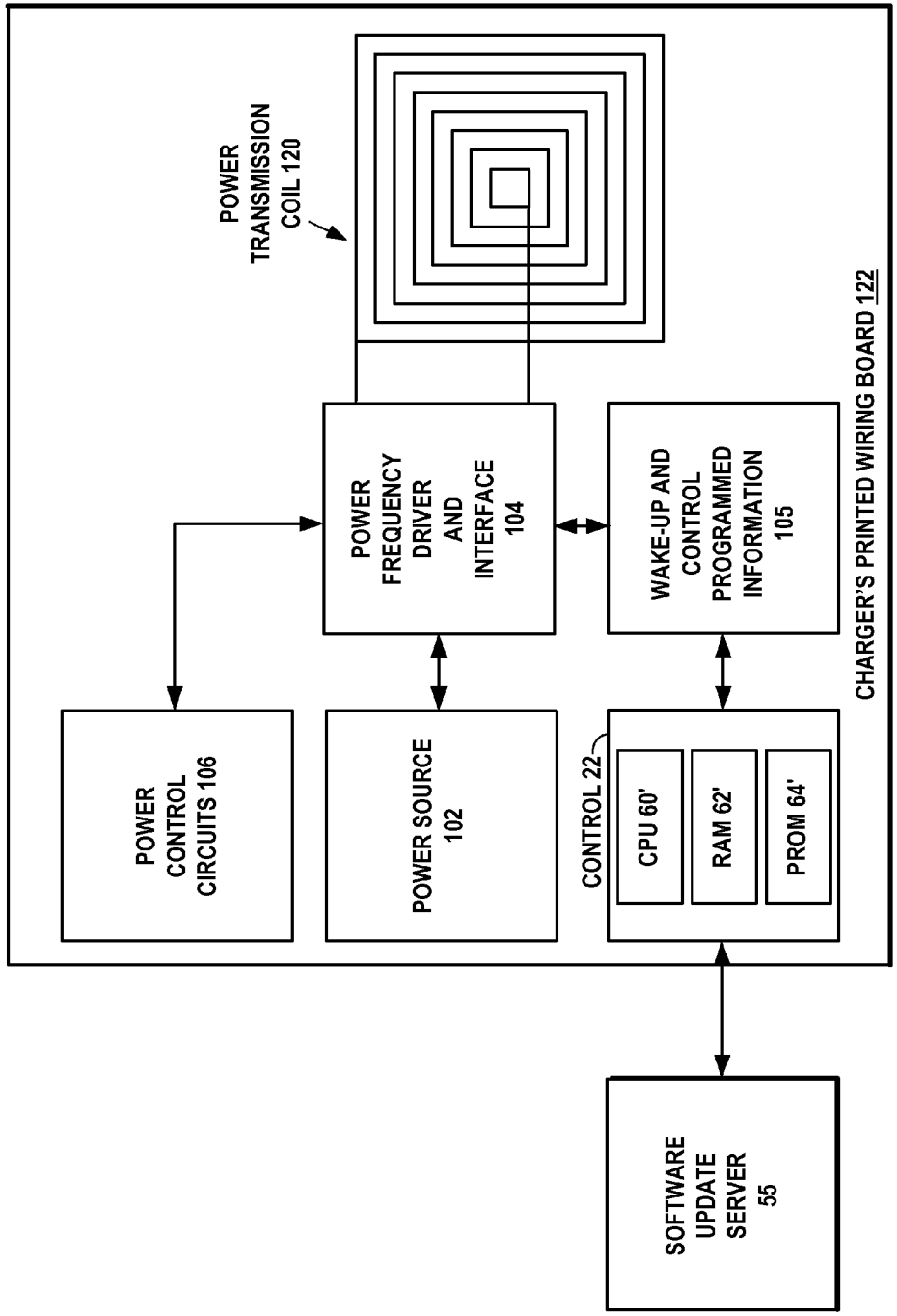

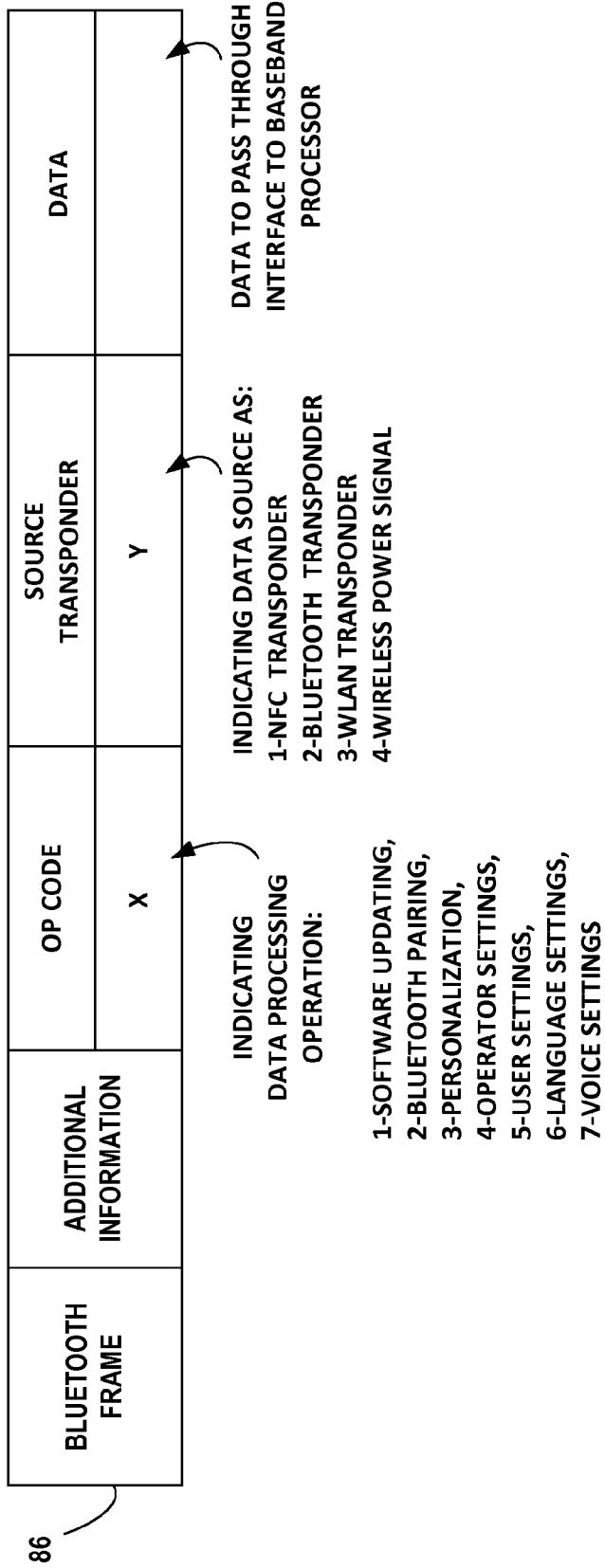

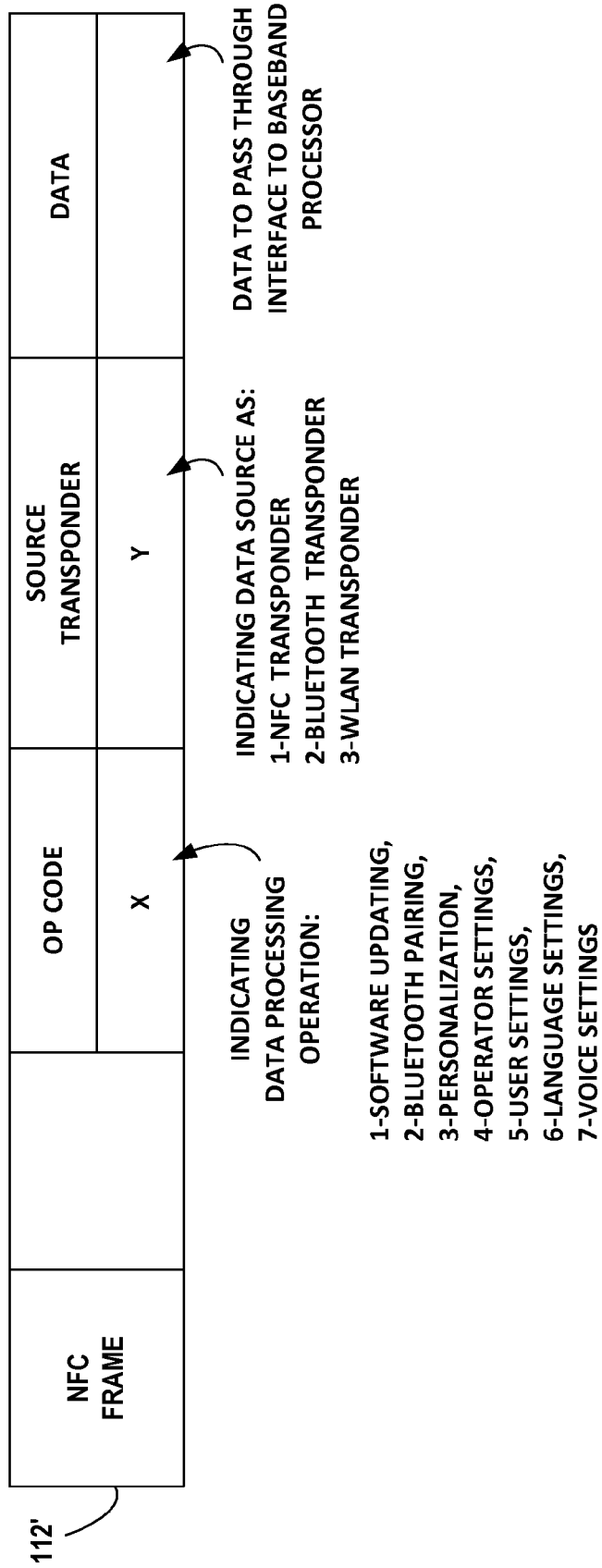

STEP 552: RECEIVING INFORMATION FROM A WIRELESS POWER RECEIVER THROUGH A CONTROL INTERFACE; AND

STEP 554: CAUSING AN INFORMATION PROCESSING OPERATION TO BE PERFORMED BASED ON THE RECEIVED INFORMATION.

METHOD, APPARATUS, AND COMPUTER PROGRAM PRODUCT FOR REMOTE WIRELESS POWERING AND CONTROL OF AN ELECTRONIC DEVICE

FIELD

The field of the invention relates to wireless communication, and more particularly to remote wireless powering and control of electronic devices.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHz/1.8 GHz bands in Europe and at 850 MHz and 1.9 GHz in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

Example method, apparatus, and computer program product embodiments are disclosed to enable remote wireless powering and control of an electronic device. Example embodiments of the invention include a method comprising the steps of detecting received power in a wireless power receiver of a device; determining to turn on the device in response to detecting the power; and sending information through a control interface to cause an information processing operation to be performed.

Example embodiments of the invention include the method further comprising: wherein the received power is received from a wireless charging device.

Example embodiments of the invention include the method further comprising: wherein the received power is received from a near field communication device.

Example embodiments of the invention include the method further comprising: wherein the information is received as a modulated component of the received power.

Example embodiments of the invention include the method further comprising: wherein the information is received in a near field communication message received by the wireless power receiver.

Example embodiments of the invention include the method further comprising: wherein the information is stored in the device.

Example embodiments of the invention include the method further comprising: wherein the information is stored in the device and receiving wireless power causes the instructions to be sent through the control interface to cause an information processing operation to be performed.

Example embodiments of the invention include the method further comprising:
 receiving additional information via a wireless communications connection; and
 using the additional information to cause the information processing operation to be performed.

Example embodiments of the invention include the method further comprising:
 receiving additional information from at least one of a Bluetooth™ connection or a wireless local area network connection; and
 using the additional information to cause the information processing operation to be performed.

Example embodiments of the invention include the method further comprising: wherein the information processing operation is at least one of software updating, Bluetooth™ pairing, personalization, operator specific settings, user specific settings, language settings, or voice control settings.

Example embodiments of the invention include an apparatus comprising:
 at least one processor;
 at least one memory including computer program code;
 the at least one memory and the computer program code configured to, with the at least one processor, cause the apparatus at least to:
 detect received power in a wireless power receiver;
 determine to turn on the apparatus in response to detecting the power; and
 send information through a control interface to cause an information processing operation to be performed.

Example embodiments of the invention include a computer program product comprising computer executable program code recorded on a computer readable non-transitory storage medium, the computer executable program code comprising:
 code for detecting received power in a wireless power receiver of a device;
 code for determining to turn on the device in response to detecting the power; and
 code for sending information through a control interface to cause an information processing operation to be performed.

Example embodiments of the invention include a method comprising:
 receiving information from a wireless power receiver through a control interface; and
 causing an information processing operation to be performed based on the received information.

Example embodiments of the invention include the method further comprising: wherein the wireless power receiver receives power from a wireless charging device.

Example embodiments of the invention include the method further comprising: wherein the wireless power receiver receives power from a near field communication device.

Example embodiments of the invention include the method further comprising: wherein the received information is derived from a modulated component of power received by the wireless power receiver.

Example embodiments of the invention include the method further comprising: wherein the received information is derived from a near field communication message received by the wireless power receiver.

Example embodiments of the invention include the method further comprising:

receiving additional information from a wireless communications connection; and causing the information processing operation to be performed using the received additional information.

Example embodiments of the invention include the method further comprising:

receiving additional information from at least one of a Bluetooth™ connection or a wireless local area network connection; and causing the information processing operation to be performed using the received additional information.

Example embodiments of the invention include the method further comprising: wherein the information processing operation is at least one of software updating, Bluetooth™ pairing, personalization, operator specific settings, user specific settings, language settings, or voice control settings.

Example embodiments of the invention include an apparatus comprising:

at least one processor;

at least one memory including computer program code;

the at least one memory and the computer program code configured to, with the at least one processor, cause the apparatus at least to:

receive information from a wireless power receiver through a control interface; and cause an information processing operation to be performed based on the received information.

Example embodiments of the invention include a computer program product comprising computer executable program code recorded on a computer readable non-transitory storage medium, the computer executable program code comprising:

code for receiving information from a wireless power receiver through a control interface; and code for causing an information processing operation to be performed based on the received information.

The resulting embodiments enable remote wireless powering and control of an electronic device.

DESCRIPTION OF THE FIGURES

FIG. 1D illustrates an example embodiment of the wireless charger of FIG. 1B coupled to a software update server, in accordance with example embodiments of the invention.

FIG. 4 illustrates an example embodiment of a Bluetooth™ frame of FIG. 1A and FIG. 3A, with additional information to control of the wirelessly charged electronic product, in accordance with example embodiments of the invention.

FIG. 4B illustrates an example embodiment of the near field communication message frame of FIG. 3D, including information to control of the electronic product, in accordance with example embodiments of the invention.

DISCUSSION OF EXAMPLE EMBODIMENTS OF THE INVENTION

While an electronic device is sealed within its product package in a manufacturing phase, product testing, warehouse, or retail store, the device's application programming and/or baseband programming may be wirelessly updated without disturbing the integrity of the package, according to an embodiment of the present invention. Example embodiments of the invention enable a packaged electronic device that is stored without its battery, to be awakened. The awakened device may be wirelessly controlled through the sealed package, to cause programmed operations to be performed, such as software updating, Bluetooth™ pairing, personalization, and storing various types of settings.

In an example embodiment, the product package may have the purpose of improved tamper resistance to deter tampering with the electronic product it contains and the package may also have tamper-evident features to help indicate tampering. In an example embodiment, the product package may have the purpose of keeping the electronic product clean, fresh, sterile and safe, as would be required, for example, for a medical device such as a programmable ultrasound probe. It may be beneficial to enable programmed operations to be performed on the electronic device sealed in such protective packages without disturbing the integrity of the package.

Figure 1A:
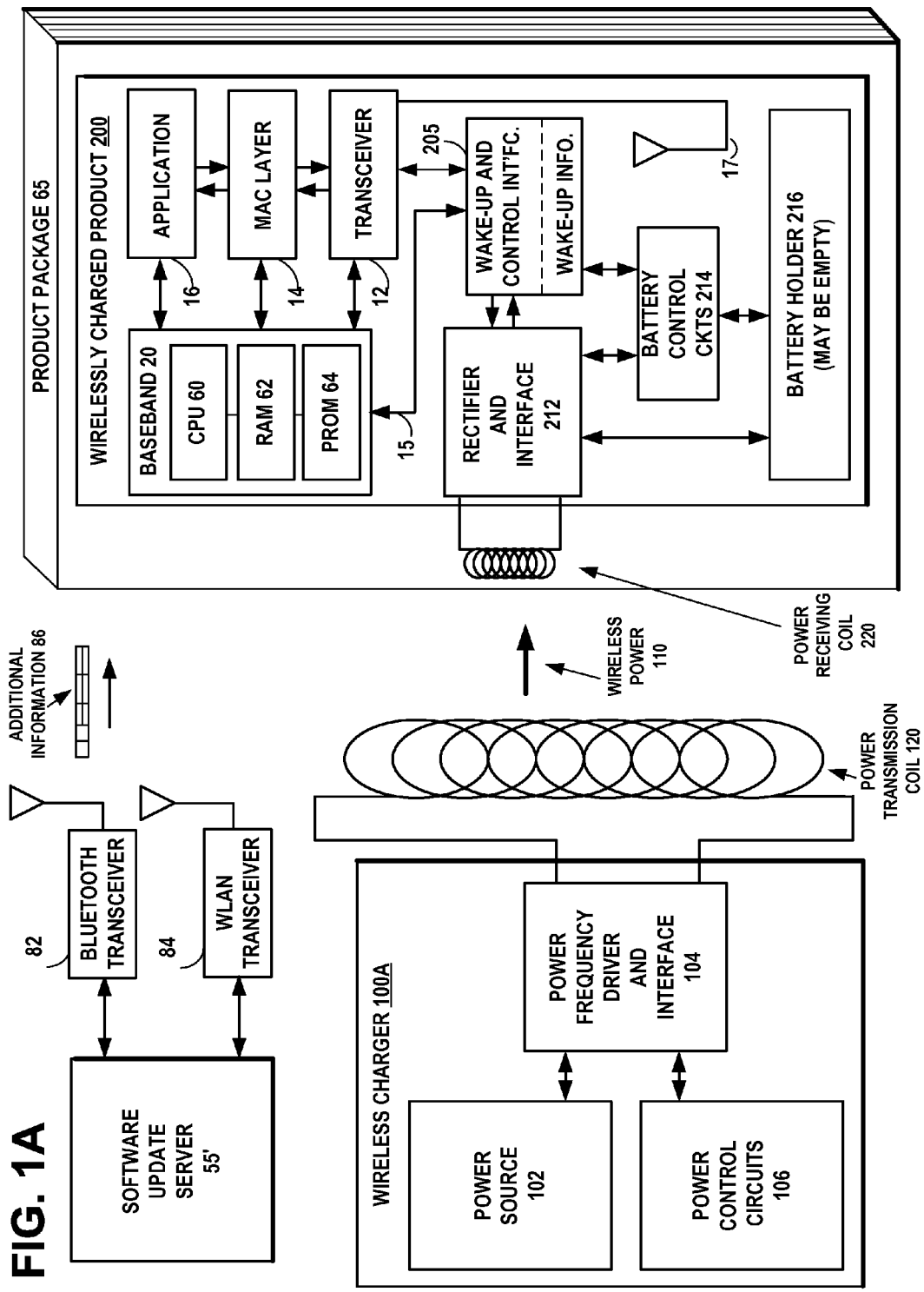
FIG. 1A illustrates an example embodiment of a wirelessly charged electronic product contained in a product package and a wireless charger providing power to the wirelessly charged product through the product package, to enable wake-up and control of the product, and including a communications connection with additional information to control the wirelessly charged electronic product, in accordance with example embodiments of the invention.

I. Remote Wireless Powering and Control with Received Power from Wireless Charging Device FIG. 1A illustrates an example embodiment of a wirelessly charged electronic product 200 contained in a product package 65 and a wireless charger 100A providing power to the wirelessly charged product through the product package, to enable wake-up and control of the product, and including a Bluetooth™ connection 82 and WLAN connection 84 with additional information 86 to control the wirelessly charged electronic product 200, in accordance with example embodiments of the invention.

The wirelessly charged electronic product 200 may be primarily a communications device, such as a cell phone, personal digital assistant (PDA), pager, Bluetooth™ headset, or the like. The electronic product 200 may also be a personal computing device such as a laptop, palmtop, or tablet computer. The electronic product 200 may also be an embedded micro-controller in an appliance, an engine control computer, a micro-controller in a digital TV, a micro-controller in a global positioning system (GPS) device, or the like. The electronic product 200 may also be a video game console or a digital toy, such as a programmable robot.

In an example embodiment, a power source circuit 102 in the wireless charging device 100A drives a power frequency driver and interface 104 that produces a source alternating current in a frequency range between 50 kHz and 20 MHz through the power transmission coil 120, which will provide energy to recharge rechargeable batteries that would be located in the battery holder 216 of the electronic product 200 during normal use. The power control circuits 106 control the power level output by the charger 100A.

In an example embodiment, when it is desired to provide software update information or other forms of updating or initialization information to the electronic product 200 while it is sealed in its product package 65, the electronic product needs to first be awakened. The power transmission coil 120 of the wireless charger 100A may be brought near the electronic product 200 to couple the magnetic flux with the power receiving coil 220, using contact-less electromagnetic induction. The contact-less electromagnetic induction may provide sufficient power to operate the electronic product 200. The wake-up and control interface 205 in the electronic product 200, may include stored wake-up information that is output to the baseband processor 20 in response to detecting the received wireless power 110. The wake-up and control interface 205 may provide the wake-up information to the baseband system 20, transceiver 12, and other needed components of the electronic product 200. In example embodiments, the absence of a battery in the battery holder 216, along with detecting the received wireless power 110, may be used as an indication to the wake-up and control interface 205 that the wake-up information may be invoked. In other example embodiments, the detecting of the received wireless power 110, may be used as an indication to the wake-up and control interface 205 that the wake-up information may be invoked, even though a battery may be present in the battery holder 216.

In an example embodiment, then the software update server 55' may provide software update information or other forms of updating or initialization information, to the Bluetooth™ connection 82 or the WLAN connection 84 as additional information 86. The additional information 86 may be transmitted to the transceiver 12 of the electronic product 200. The additional information 86 may pass through the wake-up and control interface 205 to provide the software update information to the baseband system 20 of the electronic product 200. The electronic product 200 may then be wirelessly controlled through its sealed package, to cause programmed operations to be performed, such as software updating, Bluetooth™ pairing, personalization, and various types of settings.

Figure 1B:
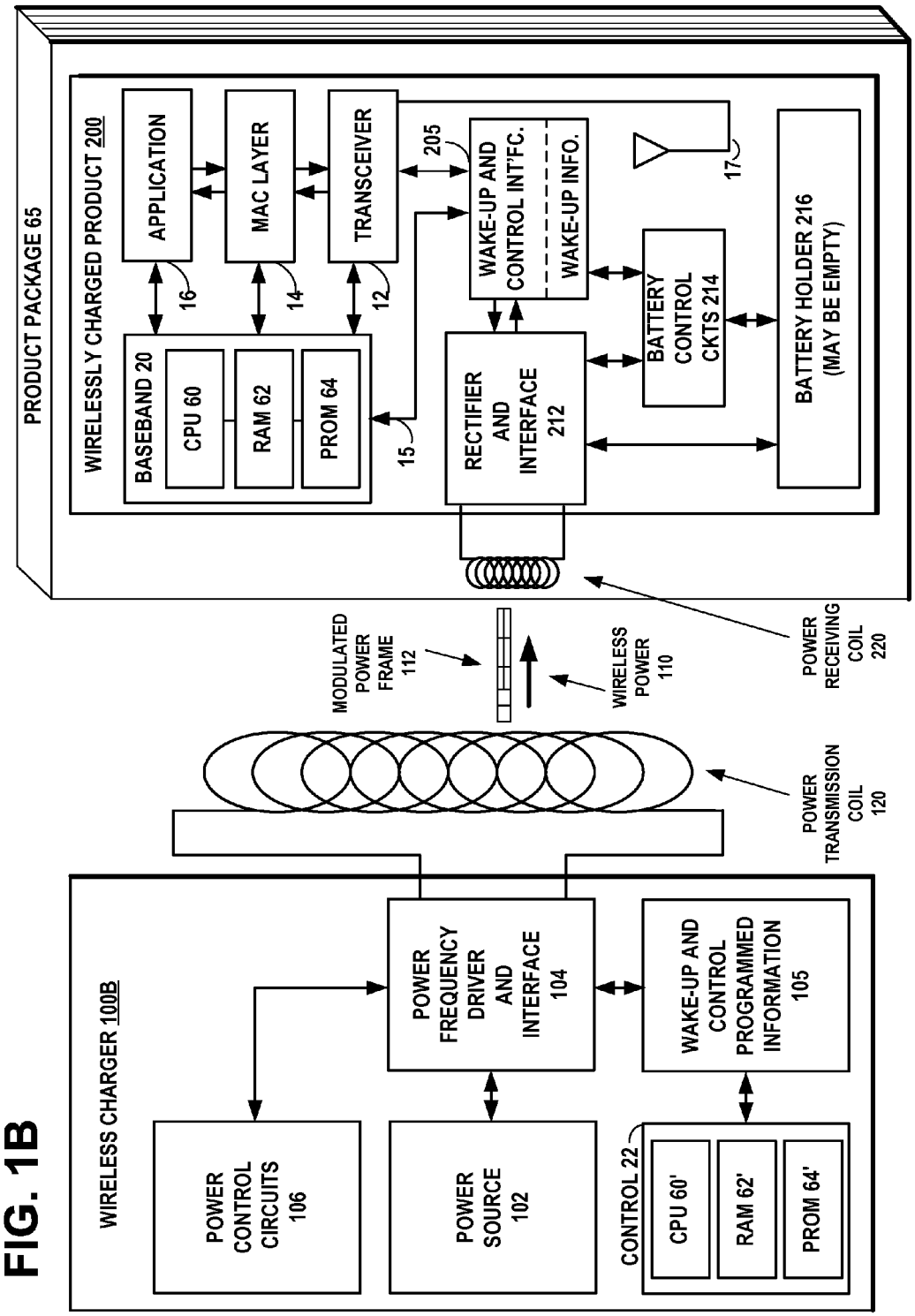
FIG. 1B illustrates an example embodiment of a wirelessly charged electronic product contained in a product package and a wireless charger providing power to the wirelessly charged product through the product package, the wireless power including information in a modulated power frame to enable wake-up and control of the product, and including a communications connection with additional information to control the wirelessly charged electronic product, in accordance with example embodiments of the invention.

FIG. 1B illustrates an example embodiment of a wirelessly charged electronic product 200 sealed in a product package 65 and a wireless charger or charging pad 100B providing power 110 to the wirelessly charged electronic product 200 through the product package 65. The wireless power 110 may include information in a modulated power frame 112 to enable wake-up and control of the product 200, in accordance with example embodiments of the invention. Alternatively, the wireless power 110 may be unmodulated. FIG. 1B includes an example embodiment of a communications connection with additional information to control the wirelessly charged electronic product.

In an example embodiment, the power frequency driver and interface 104 in the wireless charger 100B, which produces a source alternating current in the power transmission coil 120, may also modulate the alternating current to enable the transmission of binary information in a modulated power frame 112 to the power receiving coil 220. In an example embodiment, frequency-shift keying ("FSK") modulation of the alternating current in the power transmission coil 120, may be used for wireless transmission of information from the wireless charger 100B to the wirelessly charged product 200. Load modulation may be used by the rectifier and interface 212 of the wirelessly charged product 200 to transmit information back to the interface 104 of the wireless charger 100B. The load modulation may occur while power is being wirelessly provided to the electronic product 200. No battery power may be required by the rectifier and interface 212 in using load modulation for communication back to the wireless charger 100B.

In an example embodiment, when it is desired to provide software update information or other forms of updating or initialization information to the electronic product 200 while it is sealed in its product package 65, the electronic product needs to first be awakened. The power transmission coil 120 of the wireless charger 100B may be brought near the electronic product 200 to couple the magnetic flux with the power receiving coil 220, using contact-less electromagnetic induction. The contact-less electromagnetic induction may provide sufficient power to operate the electronic product 200. The wake-up and control interface 205 in the electronic product 200, may include stored wake-up information or wake-up instructions that are output to the baseband processor 20 in response to detecting the received wireless power 110. The wake-up and control interface 205 may provide the wake-up information to the baseband system 20, transceiver 12, and other needed components of the electronic product 200. In example embodiments, the absence of a battery in the battery holder 216, along with detecting the received wireless power 110, may be used as an indication to the wake-up and control interface 205 that the wake-up information may be invoked. In other example embodiments, the detecting of the received wireless power 110, may be used as an indication to the wake-up and control interface 205 that the wake-up information may be invoked, even though a battery may be present in the battery holder 216.

Figure 2A:
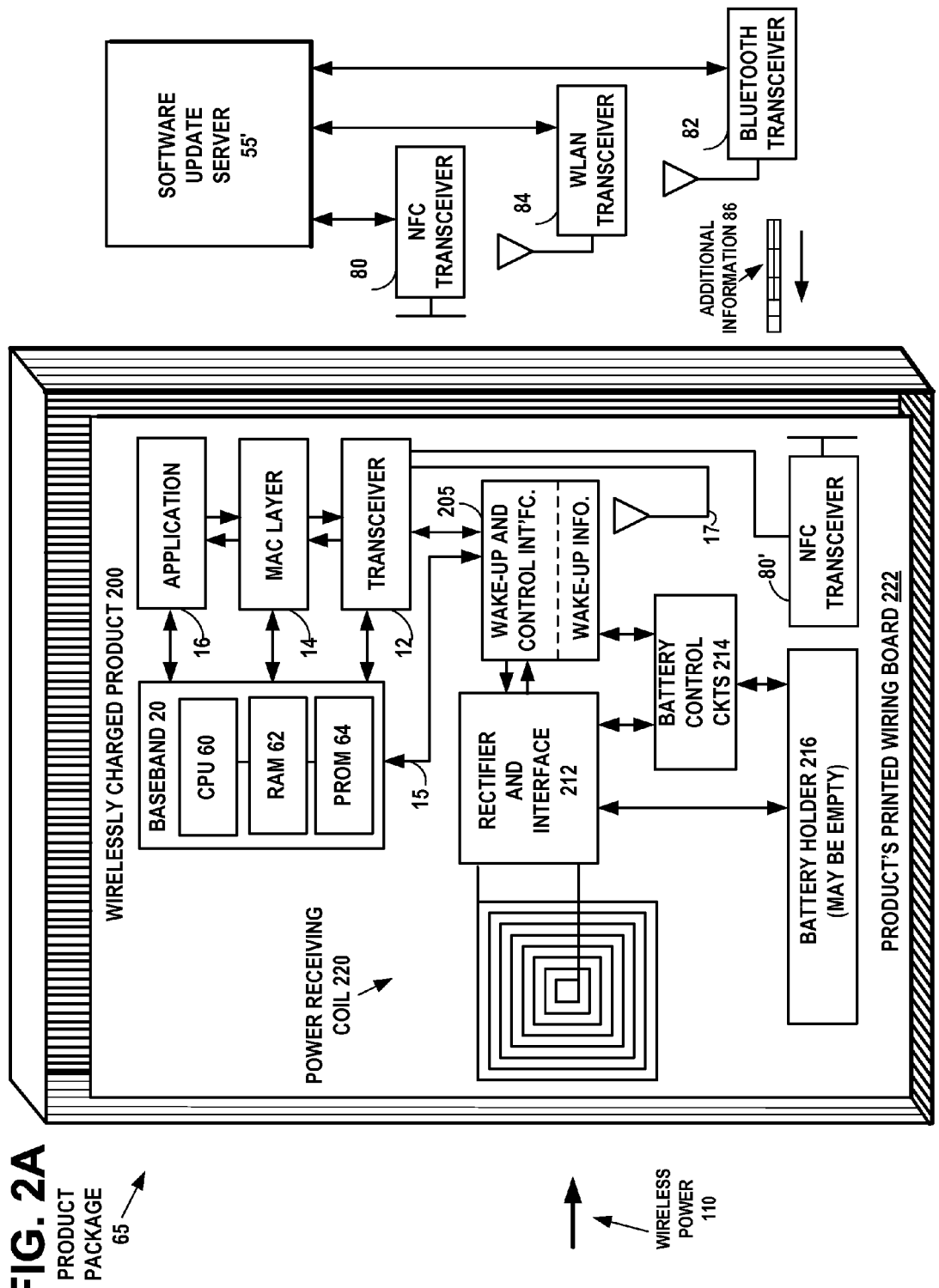
FIG. 2A illustrates an example embodiment of the wirelessly charged electronic product contained in the product package of FIG. 1A, wirelessly coupled to one or more of an near field communication (NFC) transceiver, a Bluetooth™ transceiver, or a WLAN transceiver coupled to a software update server, to provide a communications connection with additional information to control of the electronic product, in accordance with example embodiments of the invention.
Figure 2B:
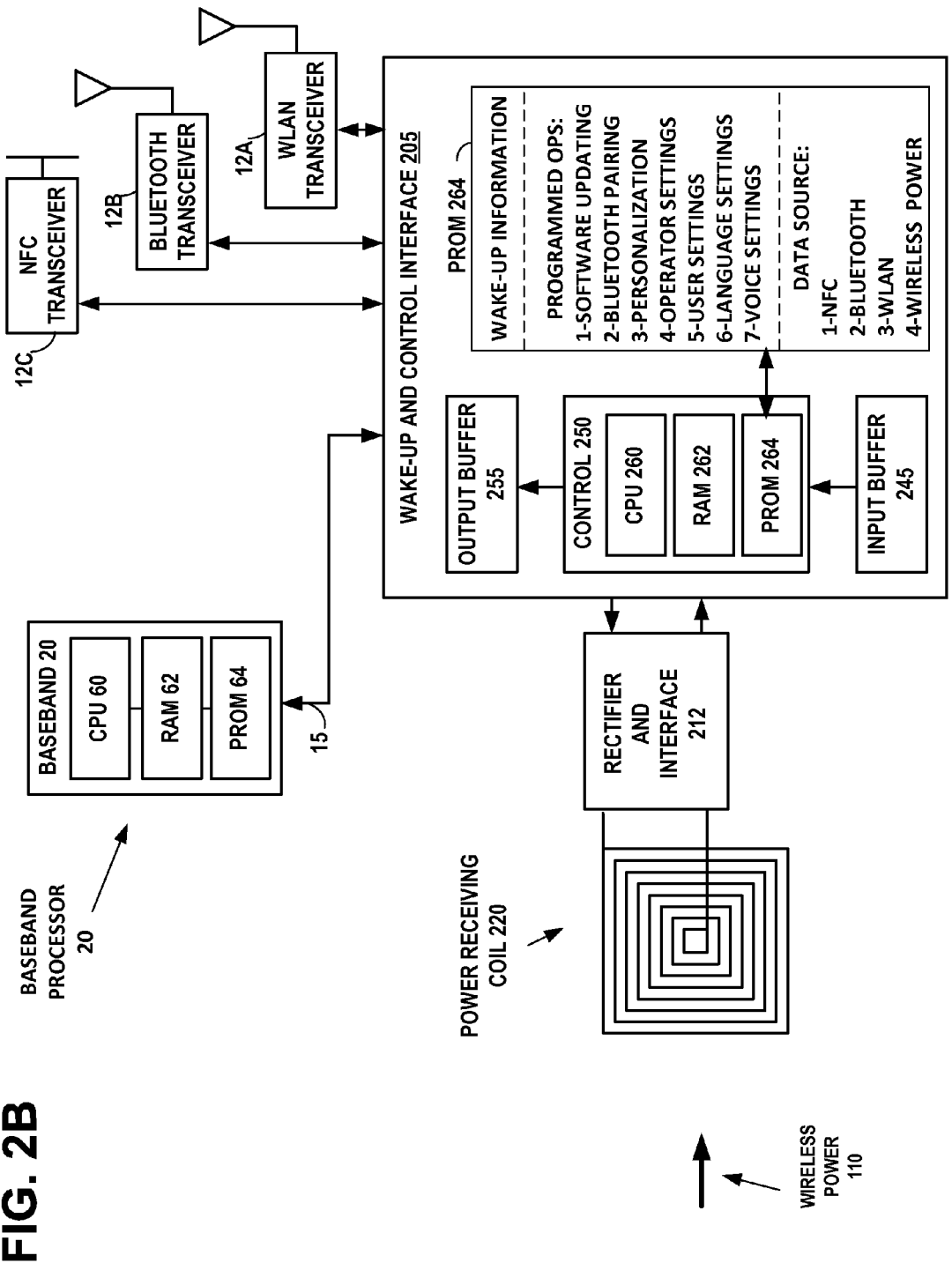
FIG. 2B illustrates an example embodiment of the wake-up and control interface in the wirelessly charged electronic product of FIG. 2A, in accordance with example embodiments of the invention.
Figure 2C:
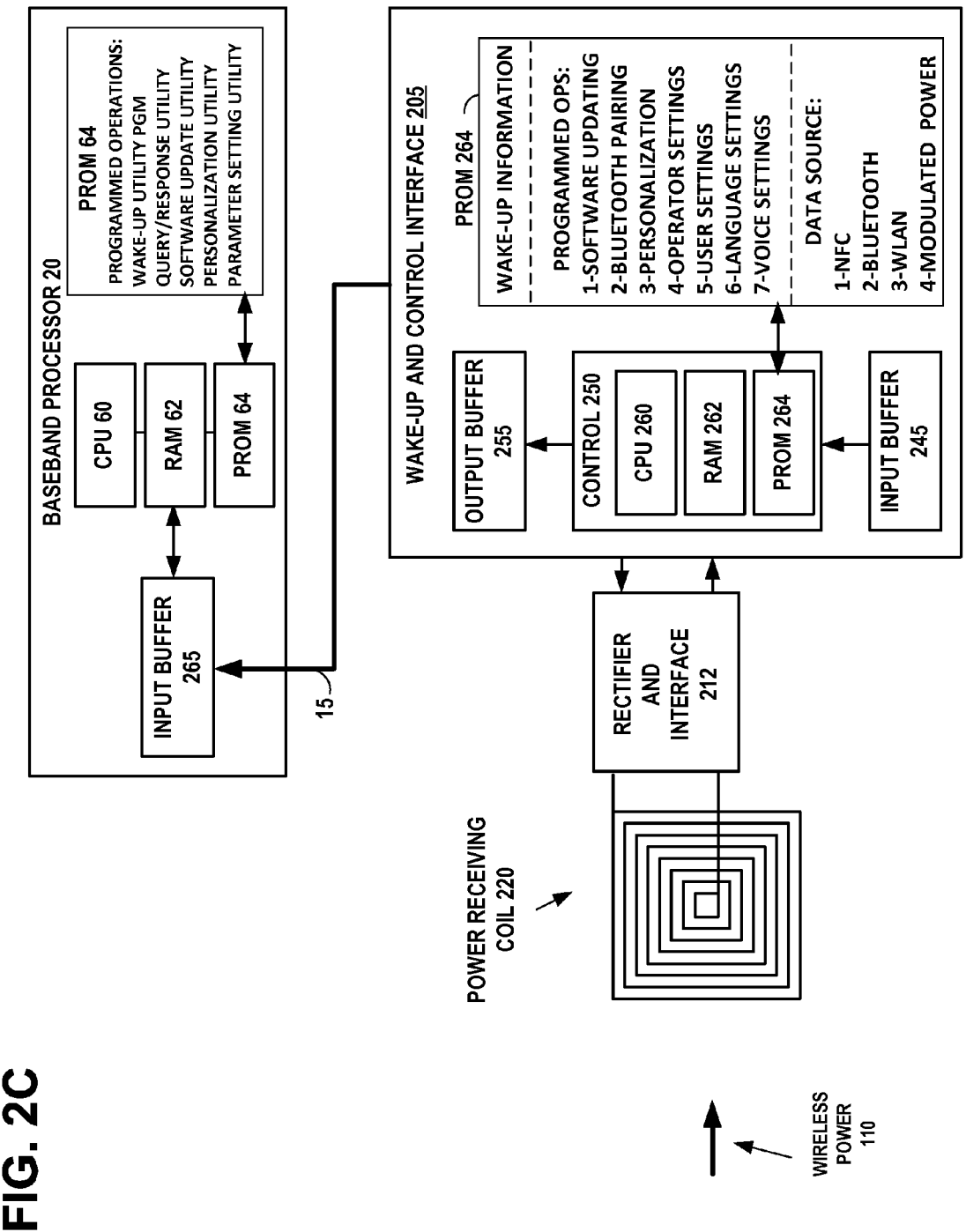
FIG. 2C illustrates an example embodiment of the baseband processor in the wirelessly charged electronic product of FIG. 2B, in accordance with example embodiments of the invention.
Figure 2D:
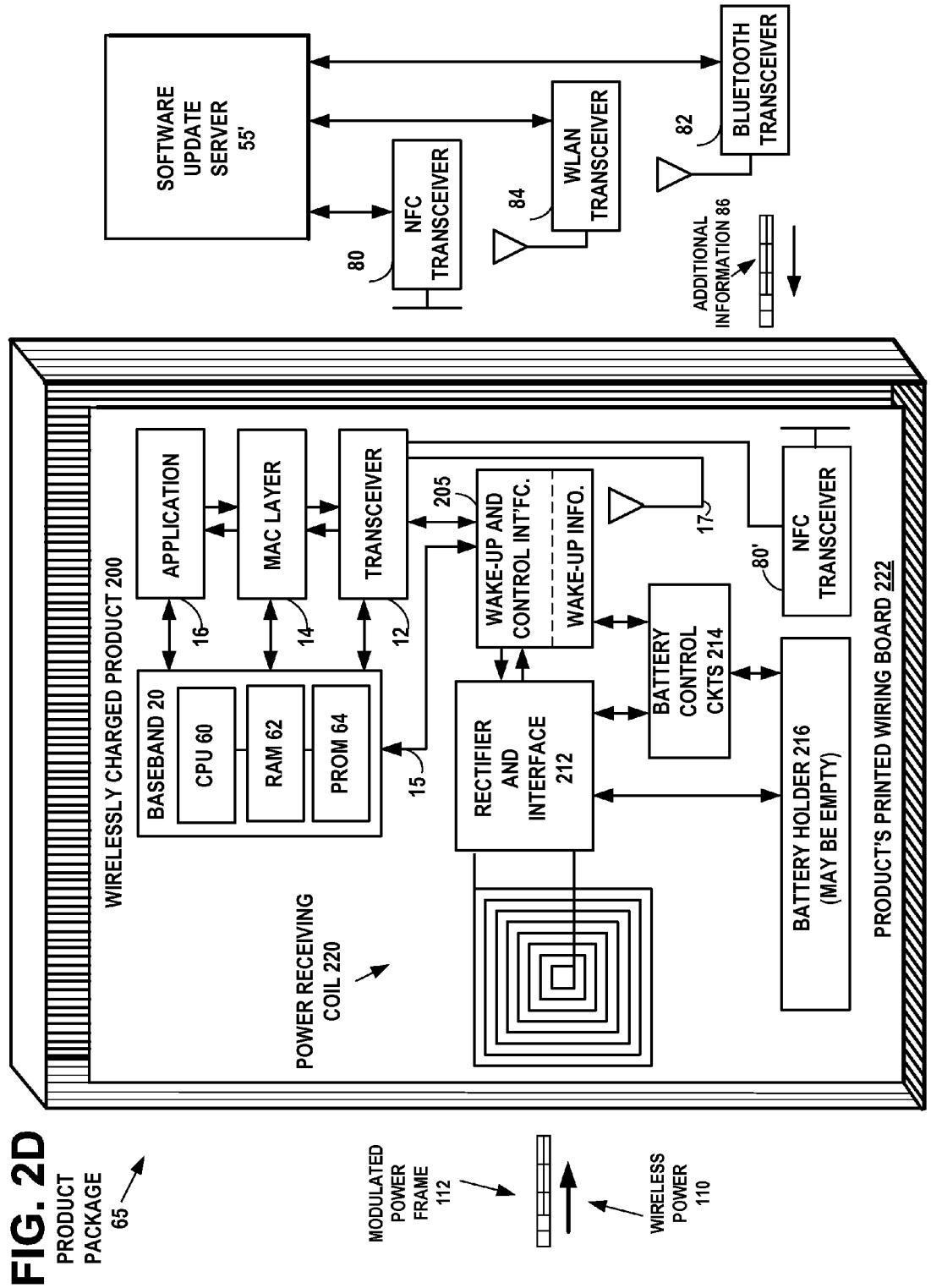
FIG. 2D illustrates an example embodiment of the wirelessly charged electronic product contained in the product package of FIG. 1B, wirelessly coupled to one or more of an near field communication (NFC) transceiver, a Bluetooth™ transceiver, or a WLAN transceiver coupled to a software update server, the wireless power including information in a modulated power frame to enable wake-up and control of the product, in accordance with example embodiments of the invention.

In an example embodiment, then the software update server 55' shown in FIG. 2D, may provide software update information or other forms of updating or initialization information, to the Bluetooth™ connection 82 or the WLAN connection 84 shown in FIG. 2D, as additional information 86. The additional information 86 may be transmitted to the transceiver 12 of the electronic product 200. The additional information 86 may pass through the wake-up and control interface 205 to provide the software update information to the baseband system 20 of the electronic product 200. The electronic product 200 may then be wirelessly controlled through its sealed package, to cause programmed operations to be performed, such as software updating, Bluetooth™ pairing, personalization, and various types of settings.

Figure 1C:
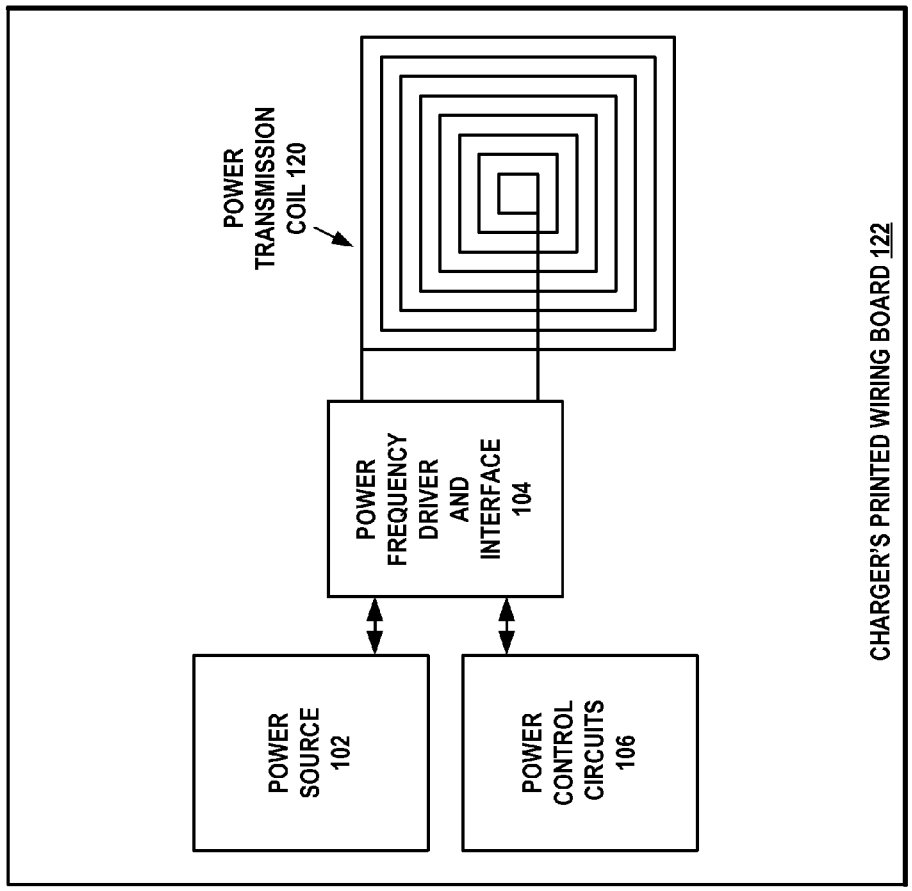
FIG. 1C illustrates an example embodiment of the wireless charger of FIG. 1A, in accordance with example embodiments of the invention.

FIG. 1C illustrates an example embodiment of the wireless charger 100A of FIG. 1A, in accordance with example embodiments of the invention. In an example embodiment, the power transmission coil 120 may be any suitable shape such as printed coil, multilayer coils, wired coils, and the like. FIG. 1C illustrates an example embodiment for a wireless charger 100A with the power transmission coil 120 being a printed wiring coil on a printed wiring board 122. In alternate embodiments, a separate printed wiring board 122 may be omitted and the coil 120 may incorporated into the body of the printed wiring board or it may be glued to a plastic substrate forming a charging plate. The power transmission coil 120 may have a relatively large area. The current carrying wires of the power transmission coil 120 generate magnetic field lines that form concentric circles of magnetic flux around the wires 120. The magnetic flux proximate to the power receiving coil 220 of the wirelessly charged product 200, couples with the power receiving coil 220, using contact-less electromagnetic induction. The contact-less electromagnetic induction provides sufficient power to the relatively small power receiving coil 220, to charge rechargeable batteries that would be located in the battery holder 216 of the electronic product 200 during normal use. The contact-less electromagnetic induction also provides sufficient power to operate the electronic product 200.

FIG. 1D illustrates an example embodiment of the wireless charger 100B of FIG. 1B coupled to a software update server, in accordance with example embodiments of the invention. FIG. 1D illustrates an example embodiment of the wireless charger 100B coupled to a software update server 55, in accordance with example embodiments of the invention. The software update server 55 may provide software update information or other forms of updating or initialization information, to the control 22 of the wireless charger 100B. The control 22 may include a central processing unit (CPU) 60', random access memory (RAM) 62', and programmable read only memory (PROM) 64'. The PROM 64' may store wake-up and control programmed instructions 105. The wake-up and control programmed instructions 105 and the software update information from the server 55 may be input to the power frequency driver and interface 104 to modulate the alternating current in the transmission coil 120, to enable the transmission of binary information in modulated power frames 112 to the power receiving coil 220 of the electronic product 200.

In an example embodiment, when it is desired to provide software update information or other forms of updating or initialization information to the electronic product 200 while it is sealed in its product package 65, the electronic product needs to first be awakened. The power transmission coil 120 of the wireless charger 100B may be brought near the electronic product 200 to couple the magnetic flux with the power receiving coil 220, using contact-less electromagnetic induction. The contact-less electromagnetic induction may provide sufficient power to operate the electronic product 200. The wireless power 110 may include a modulated power frame 112 with a wake-up code that is recognized by the wake-up and control interface 205 in the electronic product 200. The wake-up and control interface 205 may then provide wake-up signals to the baseband system 20, transceiver 12, and other needed components of the electronic product 200.

In an example embodiment, then the software update server 55 may provide software update information or other forms of updating or initialization information, to the control 22 of the wireless charger 100B. The control programmed instructions 105 and the software update information from the server 55 may then modulate the alternating current in the transmission coil 120, to enable the transmission of modulated power frames 112 bearing that information to the power receiving coil 220 of the electronic product 200. The wireless power 110 may include the modulated power frames 112 with control programmed instructions 105 and the software update information that is processed by the wake-up and control interface 205 in the electronic product 200. The wake-up and control interface 205 may then provide the software update information to the baseband system 20, transceiver 12, and other needed components of the electronic product 200. The electronic product 200 may then be wirelessly controlled through its sealed package, to cause programmed operations to be performed, such as software updating, Bluetooth™ pairing, personalization, and various types of settings.

FIG. 2A illustrates an example embodiment of the wirelessly charged electronic product 200 contained in the product package 65 of FIG. 1A, which may be wirelessly coupled to one or more of an NFC transceiver 80, a Bluetooth™ transceiver 82, or a WLAN transceiver 84 that are coupled to a software update server 55', to provide a communications connection with additional information to control of the electronic product, in accordance with example embodiments of the invention. The wake-up and control interface 205 may include a designation of a data source from which may be wirelessly downloaded additional software update information or other forms of updating or initialization information, including the NFC transceiver 80, Bluetooth™ transceiver 82, and WLAN transceiver 84, which are coupled to the software update server 55'.

In example embodiments of the invention, transceiver 12 of the electronic product 200 contained in the product package 65 of FIG. 2B, may use a suitable short-range communications protocol, such as Bluetooth™, Radio Frequency Identification (RFID), Near Field Communication (NFC), Infrared Data Association (IrDA), Ultra Wide Band (UWB), or IEEE 802.11 WLAN, for example, that is respectively wirelessly coupled to a corresponding transceiver of the same type coupled to the software update server 55'.

An example of the Bluetooth™ out-of-band short-range carrier is described, for example, Bluetooth™ devices is described in the *Bluetooth™ Specification*, Version 4, Jun. 30, 2010, incorporated herein by reference.

An example of the Radio Frequency Identification (RFID) out-of-band short-range carrier is described, for example, ISO 11785 (air interface protocol), ISO 14443 (air interface protocol), and ISO 15693, incorporated herein by reference.

An example of the Near Field Communication (NFC) out-of-band short-range carrier is described, for example, in ISO/IEC 14443 and ISO/IEC 18092, incorporated herein by reference.

An example of the Infrared Data Association (IrDA) out-of-band short-range carrier is described, for example, in *IrDA Link Access Protocol*, v1.1 (1996), incorporated herein by reference.

An example of the Ultra Wide Band (UWB) out-of-band short-range carrier is described, for example, in *WiMedia Common Radio Platform Specification*, Version 1.5 (2010), incorporated herein by reference.

An example of the IEEE 802.11 WLAN out-of-band carrier is described, for example, in *IEEE 802.11-2007, Wireless Medium Access Control (MAC) and Physical Layer (PHY) Specifications*, June 2007 (incorporated herein by reference).

FIG. 2B illustrates an example embodiment of the wake-up and control interface in the wirelessly charged electronic product of FIG. 2A, in accordance with example embodiments of the invention. The wake-up and control interface 205 may include the control 250 that includes the CPU 260, the RAM 262, and the PROM 264. The CPU 260 may be a dual processor or multi-processor. The PROM 264 may store programmed operations and data source addresses. In an example embodiment, when it is desired to provide software update information or other forms of updating or initialization information to the electronic product 200 while it is sealed in its product package 65, the electronic product needs to first be awakened. The power transmission coil 120 of the wireless charger 100A may be brought near the electronic product 200 to couple the magnetic flux with the power receiving coil 220, using contact-less electromagnetic induction. The contact-less electromagnetic induction may provide sufficient power to operate the electronic product 200. The wake-up and control interface 205 in the electronic product 200, may include stored information, for example wake-up instructions, that are output to the baseband processor 20 in response to detecting the received wireless power 110. The wake-up and control interface 205 may provide the wake-up instructions to the baseband system 20, transceiver 12, and other needed components of the electronic product 200.

FIG. 2C illustrates an example embodiment of the baseband processor in the wirelessly charged electronic product of FIG. 2B, in accordance with example embodiments of the invention. The baseband processor 20 may include the CPU 60, RAM 62, PROM 64, and input buffer 265 that may be coupled to the wake-up and control interface 205. The CPU 60 may be a dual processor or multi-processor. The PROM 64 may store programmed operations including, for example, a wake-up utility program, a query/response utility program, a software update utility program, a personalization utility program, and a parameter setting utility program. In an example embodiment, the baseband processor 20 may be embodied as a single integrated circuit semiconductor chip, known as a baseband system on chip. In an alternate example embodiment, the baseband processor 20 may be embodied as two or more integrated circuit semiconductor chips in a chip set. In an example embodiment, the PROM 64 may be a flash memory or other non-volatile computer storage chip that may be electrically erased and reprogrammed.

In an example embodiment where the wirelessly charged electronic product 200 may be primarily a communications device, such as for example a cell phone, PDA, pager, or Bluetooth™ headset, the baseband processor 20 may manage the communication functions of the electronic product 200. Example communication functions may be radio control functions such as signal modulation, encoding, radio frequency shifting, and the like. These communication functions may be based on baseband programming instructions stored as firmware in the PROM 64. In accordance with an example embodiment of the invention, the baseband programming may be wirelessly updated and various settings stored in the baseband processor 20, without disturbing the integrity of its sealed product package 65.

In an alternate example embodiment where the wirelessly charged electronic product 200 may be a laptop, palmtop, or tablet computer, or the like, the baseband processor 20 may be a microprocessor and its system software may be stored in the PROM 64 as firmware. In accordance with an example embodiment of the invention, the system software may be wirelessly updated and various settings stored in the PROM 64 and/or microprocessor, without disturbing the integrity of its sealed product package 65.

In an alternate example embodiment where the wirelessly charged electronic product 200 may be an embedded microcontroller in an appliance, in an engine, in a digital TV, in a video game console, in a programmable robot, or the like, the baseband processor 20 may be the micro-controller and its system software may be stored in the PROM 64 as firmware. In accordance with an example embodiment of the invention, the system software may be wirelessly updated and various settings stored in the PROM 64 and/or microcontroller, without disturbing the integrity of its sealed product package 65.

In an example embodiment, the wake-up and control interface 205 in the electronic product 200, may include stored information, for example, wake-up instructions that are output to the baseband processor 20 in response to detecting the received wireless power 110. The wake-up and control interface 205 may provide the wake-up instructions to the baseband system 20, transceiver 12, and other needed components of the electronic product 200.

The NFC transceiver 80, Bluetooth™ transceiver 82, or WLAN transceiver 84 coupled to a software update server 55' in FIG. 2B, may provide additional information to control the electronic product, in accordance with example embodiments of the invention. The wake-up and control interface 205 may wirelessly download additional software update information or other forms of updating or initialization information from the NFC transceiver 80, Bluetooth™ transceiver 82, and WLAN transceiver 84, from the software update server 55'. This information is then sent by wake-up and control interface 205 to the baseband processor 20. The CPU 60 of the baseband processor 20 may cause to be stored the example received software update information at the baseband memory address in the PROM, using the software update utility program.

FIG. 2D illustrates an example embodiment of the wirelessly charged electronic product contained in the product package of FIG. 1B, wirelessly coupled to one or more of an near field communication (NFC) transceiver, a Bluetooth™ transceiver, or a WLAN transceiver coupled to a software update server, the wireless power including information in a modulated power frame 112 to enable wake-up and control of the product, in accordance with example embodiments of the invention. The wirelessly charged electronic product 200 contained in the product package 65 of FIG. 2D, may be wirelessly coupled to one or more of an NFC transceiver 80, a Bluetooth™ transceiver 82, or a WLAN transceiver 84 that are coupled to the software update server 55', to provide a communications connection with additional information 86 control of the electronic product, in accordance with example embodiments of the invention. The additional information 86 may be transmitted to the transceiver 12 of the electronic product 200. The additional instructions 86 may pass through the wake-up and control interface 205 to provide the software update information to the baseband system 20 of the electronic product 200. The electronic product 200 may then be wirelessly controlled through its sealed package, to cause programmed operations to be performed, such as software updating, Bluetooth™ pairing, personalization, and various types of settings.

Figure 3A:
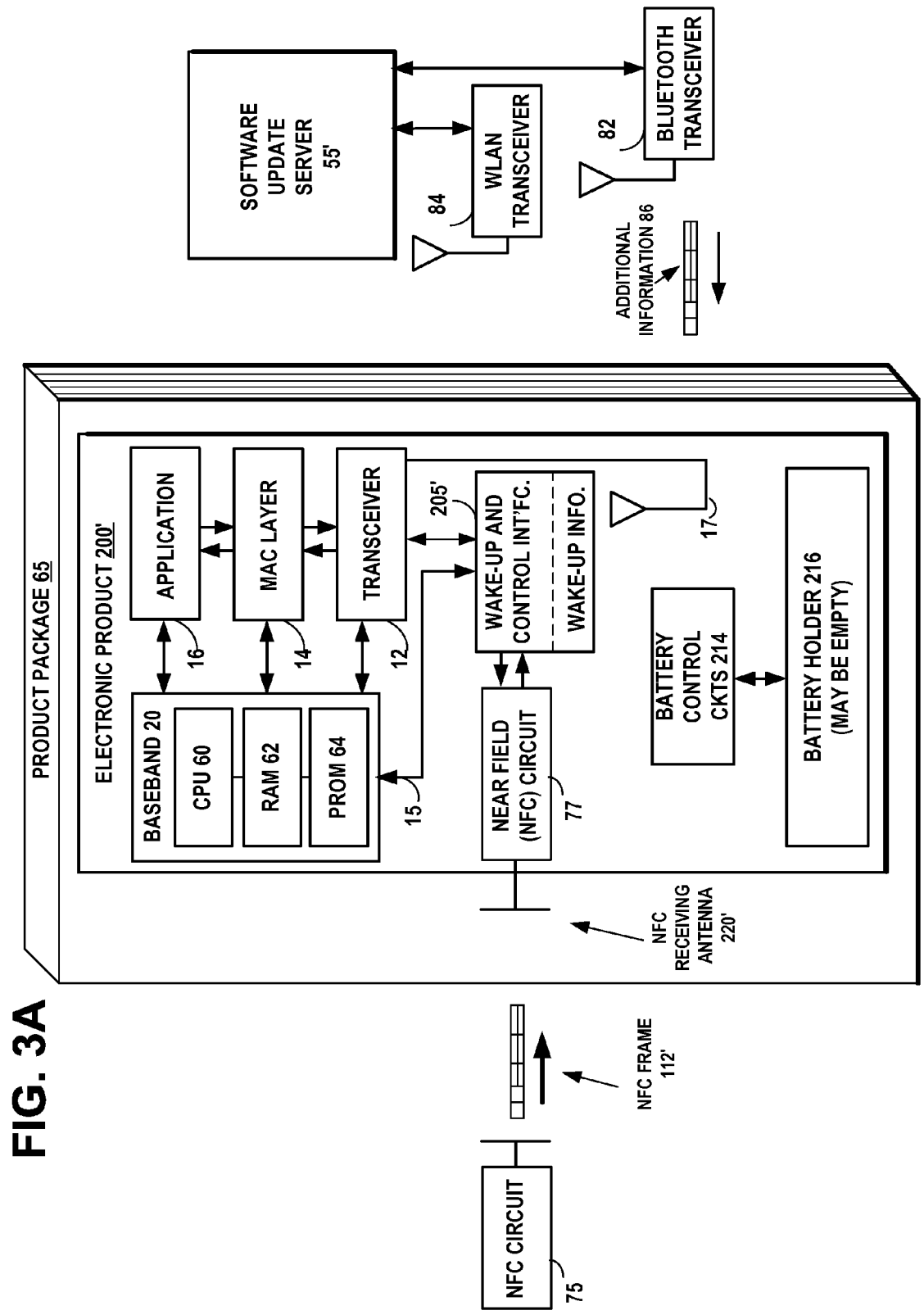
FIG. 3A illustrates an example embodiment of the electronic product contained in the product package and a near field communication circuit providing near field communication messages to the product through the product package, the electronic product wirelessly coupled to one or more of a Bluetooth™ transceiver or a WLAN transceiver coupled to a software update server, to provide a communications connection with additional information to control the electronic product, in accordance with example embodiments of the invention.

FIG. 4 illustrates an example embodiment of a Bluetooth™ frame 86 of FIG. 1A and FIG. 3A, with additional information to control of the electronic product 200, in accordance with example embodiments of the invention. The additional information 86 may be transmitted to the transceiver 12 of the electronic product 200. The additional information 86 may pass through the wake-up and control interface 205 to provide the software update information to the baseband system 20 of the electronic product 200. The electronic product 200 may then be wirelessly controlled through its sealed package, to cause programmed operations to be performed, such as software updating, Bluetooth™ pairing, personalization, and various types of settings. The Bluetooth™ frame 86 may contain information to enable wake-up and control of the wirelessly charged electronic product 200, in accordance with example embodiments of the invention. The Bluetooth™ frame 86 may include a field for the additional information. The Bluetooth™ frame 86 may include a field for the operation code (OP Code) indicating the desired data processing operation. The OP code is the portion of a machine language instruction that specifies the operation to be performed. The Bluetooth™ frame 86 may include a field for indicating the data source for wirelessly downloaded additional software update information or other forms of updating or initialization information. And the Bluetooth™ frame 86 may include data to pass through the interface 205 to the baseband processor 20.

Figure 4A:
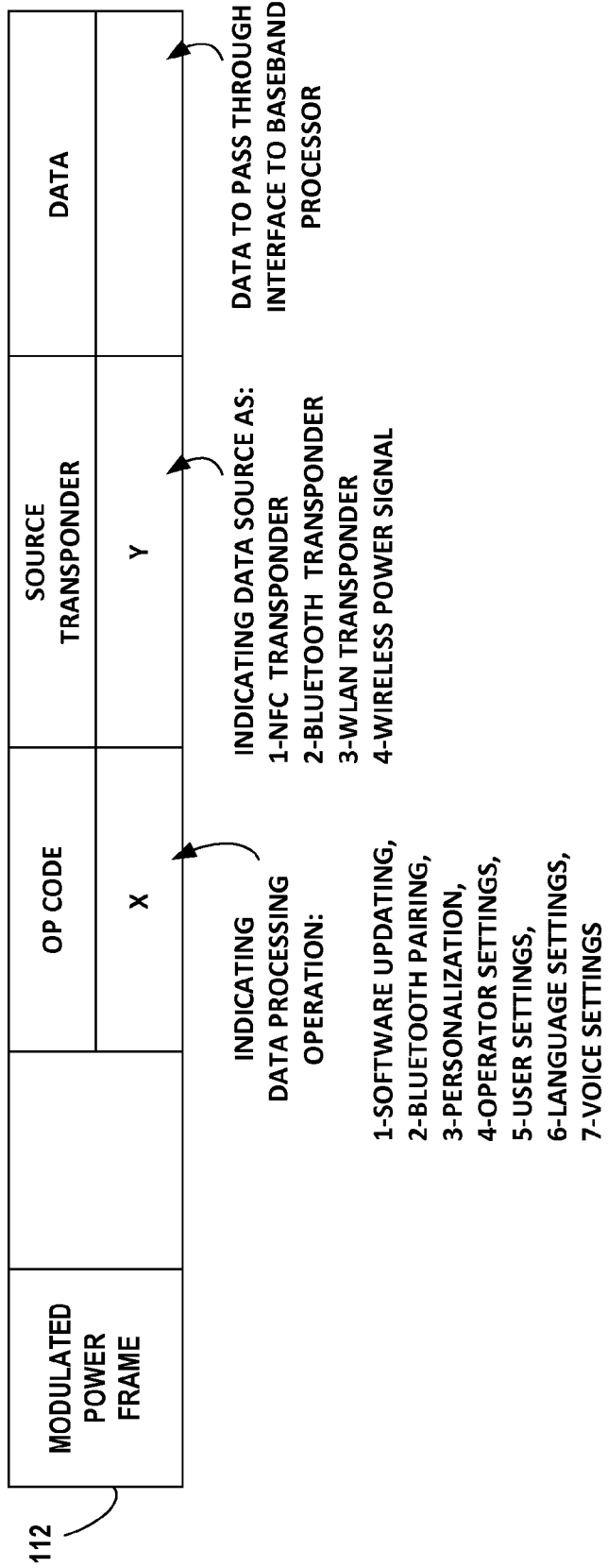
FIG. 4A illustrates an example embodiment of the modulated power frame of FIG. 1B, with information to enable control of the wirelessly charged electronic product, in accordance with example embodiments of the invention.

FIG. 4A illustrates an example embodiment of the modulated power frame 112 of FIG. 1B, with information to enable wake-up and control of the wirelessly charged electronic product 200, in accordance with example embodiments of the invention. The modulated power frame 112 includes a field for the operation code (OP Code) indicating the desired data processing operation. The OP code is the portion of a machine language instruction that specifies the operation to be performed. The modulated power frame 112 includes a field for indicating the data source for wirelessly downloaded additional software update information or other forms of updating or initialization information. And the modulated power frame 112 includes data to pass through the interface 205 to the baseband processor 20.

In an example embodiment, example OP Codes in the modulated power frame 112 indicating the desired data processing operation may include the following example codes and operations:

| Op Code | Operation |
| --- | --- |
| 1 | Software Updating |
| 2 | Bluetooth ™ Pairing |
| 3 | Personalization |
| 4 | Operator Settings |
| 5 | User Settings |
| 6 | Language Settings |
| 7 | Voice Settings. |

In an example embodiment, example data sources in the modulated power frame 112 indicating the source for wirelessly downloaded additional software update information or other forms of updating or initialization information, may include the following example data source codes and source address:

| Data Source Code | Source Address |
| --- | --- |
| 1 = NFC | Transceiver 12C |
| 2 = Bluetooth ™ | Transceiver 12B |
| 3 = WLAN | Transceiver 12A |
| 4 = Modulated Power | Power Interface 212 |

In an example embodiment, these OP codes and data source codes may be recognized by the wake-up and control interface 205 in the electronic product 200. The wake-up and control interface 205 may then send the information through the control interface 205 to cause the corresponding information processing operation to be performed in the electronic product 200.

In alternate example embodiments, these OP codes and data source codes may be passed through to the baseband processor 20 where they are recognized. The utility programs in the baseband processor 20 corresponding to the OP codes, may then be executed in the baseband processor 20 to cause the corresponding information processing operations to be performed in the electronic product 200.

Figure 3B:
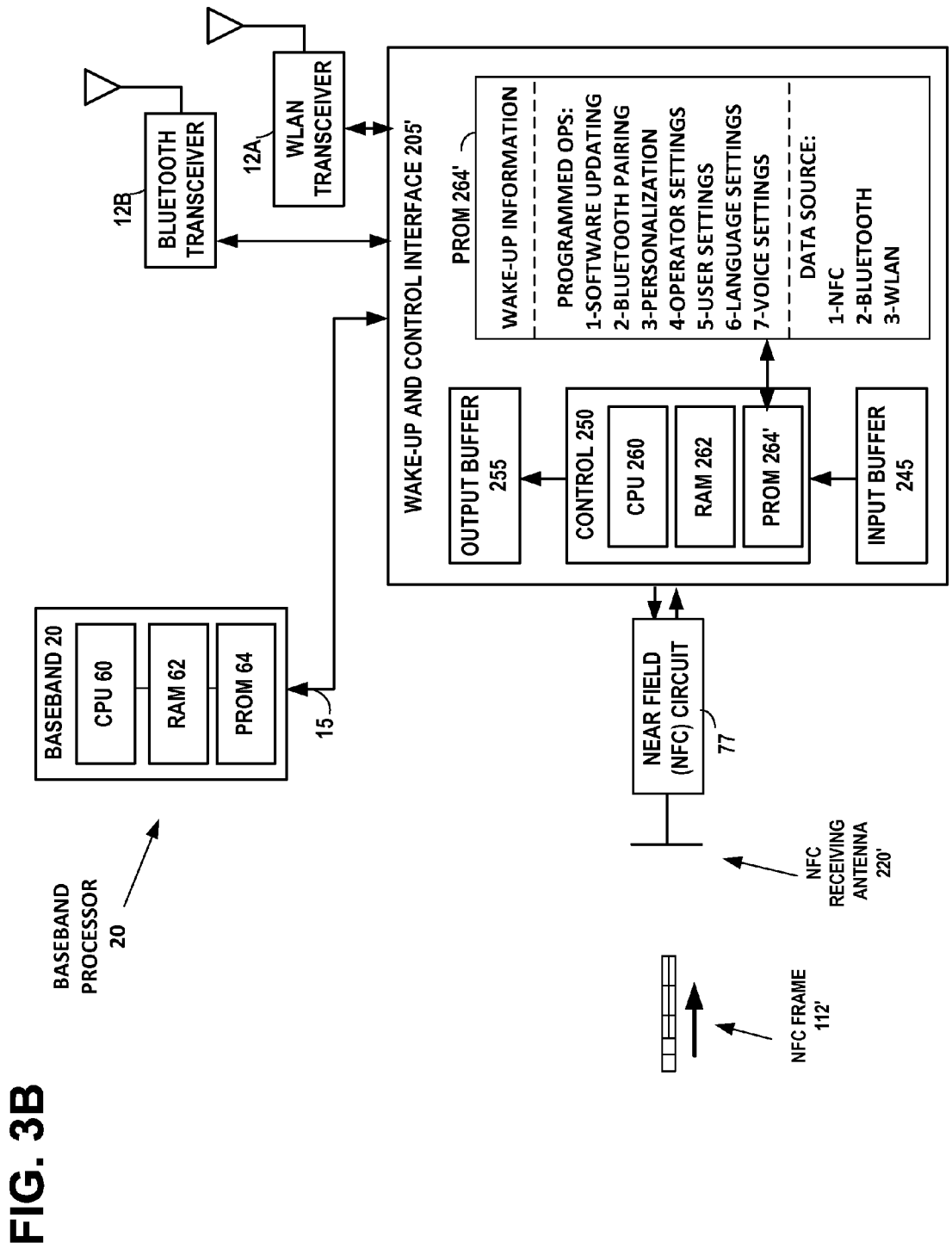
FIG. 3B illustrates an example embodiment of the wake-up and control interface in the electronic product of FIG. 3A, in accordance with example embodiments of the invention.
Figure 3C:
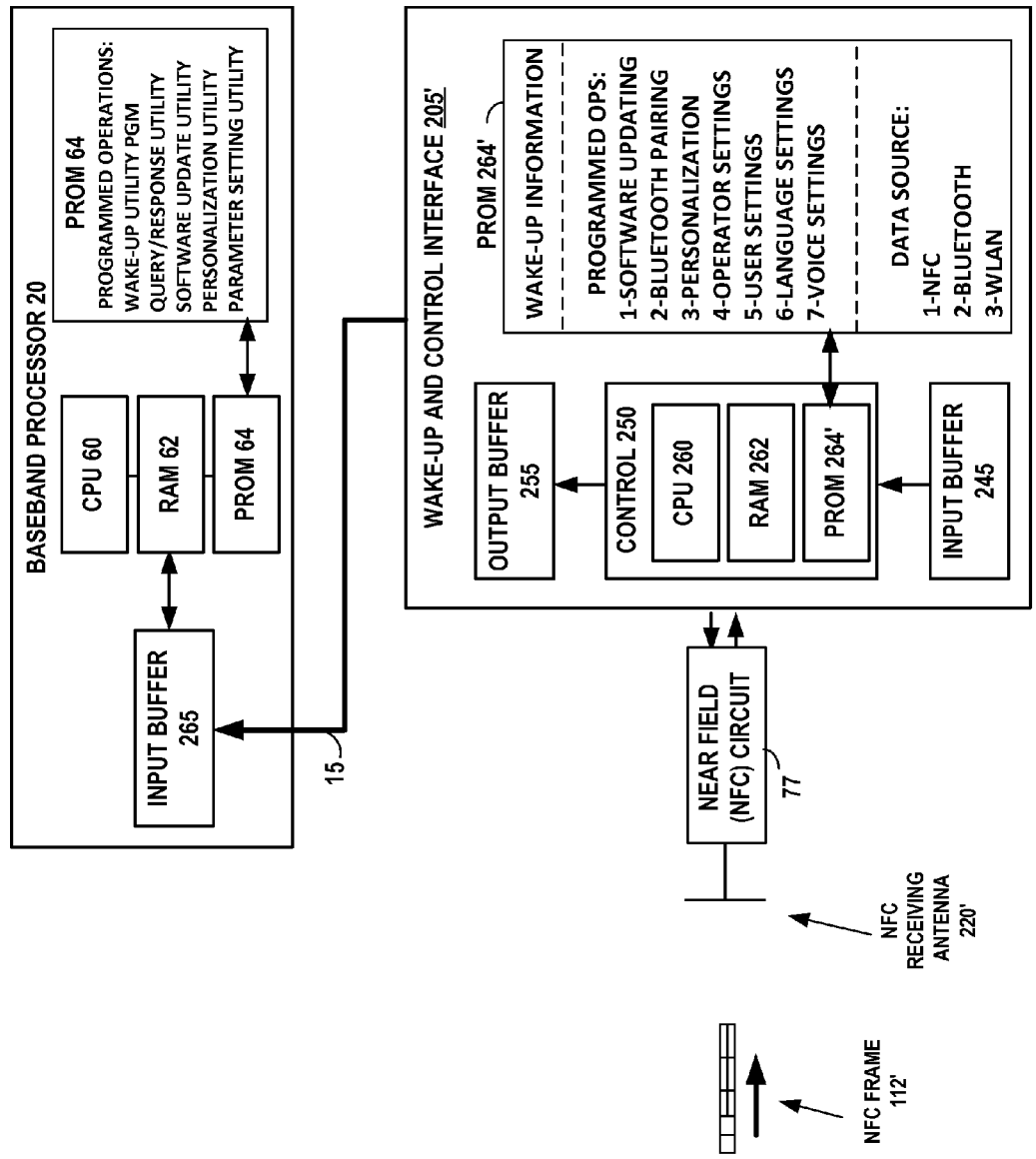
FIG. 3C illustrates an example embodiment of the baseband processor in the electronic product of FIG. 3B, in accordance with example embodiments of the invention.
Figure 5A:
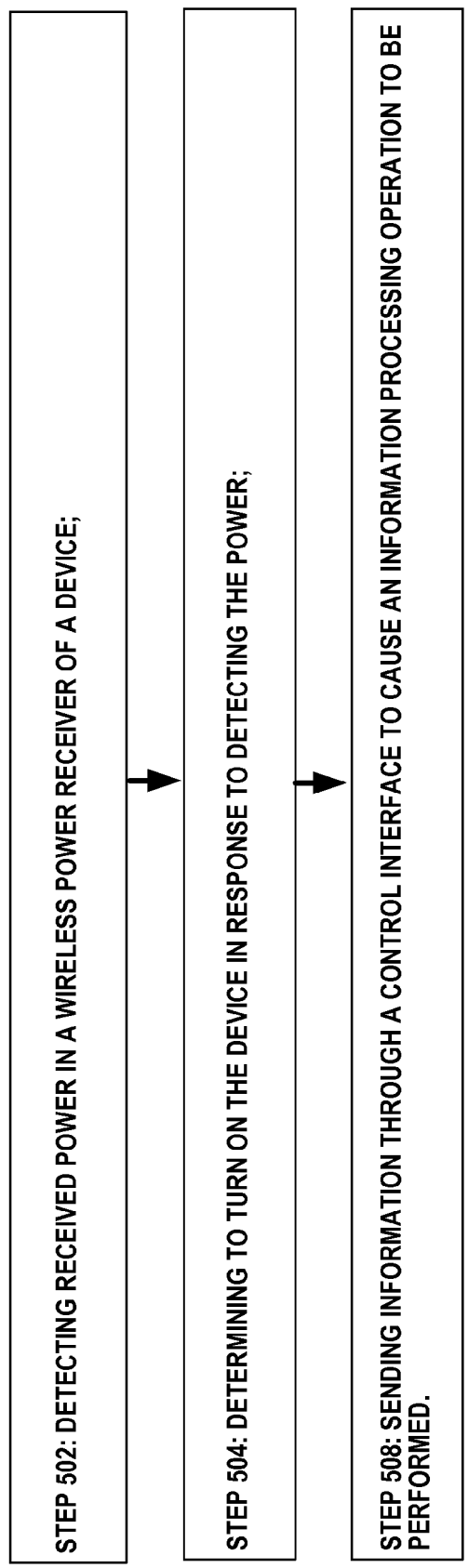
FIG. 5A is an example flow diagram 500 of example operational steps of an example embodiment of the method carried out by the wake-up and control interface of FIG. 2C or FIG. 3C, according to an embodiment of the present invention.

FIG. 5A is an example flow diagram 500 of example operational steps of an example embodiment of the method carried out by the wake-up and control interface of FIG. 2C or FIG. 3C, according to an embodiment of the present invention. The steps of the flow diagram represent computer code instructions stored in the RAM and/or PROM memory of the wake-up and control interface, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 502: detecting received power in a wireless power receiver of a device;

Step 504: determining to turn on the device in response to detecting the power; and Step 508: sending information through a control interface to cause an information processing operation to be performed.

Example embodiments of the invention include an apparatus comprising:

at least one processor, for example the CPU 260 in the wake-up and control interface 205 of FIG. 2C;

at least one memory including computer program code, for example the RAM 262 or PROM 264 containing the programmed operations and data source addresses, in the wake-up and control interface 205 of FIG. 2C;

the at least one memory and the computer program code configured to, with the at least one processor, cause the apparatus at least to:

detect received power in a wireless power receiver, for example the wireless power 110 is detected by the wake-up and control interface 205 via the rectifier and interface 212 of FIG. 2C;

determine to turn on the apparatus in response to detecting the power, for example the wake-up and control interface 205 is energized by the wireless power 110 and causes the energy of the wireless power 110 to be applied to various components of the wirelessly charged electronic product 200; and send information through a control interface to cause an information processing operation to be performed, for example the wake-up and control interface 205 responds to the detected power by sending the wake-up instructions stored in the wake-up and control interface 205 to its output buffer 255 to be forwarded to the baseband processor 20, to cause the wake-up instructions to be executed by the CPU 60 and/or information to be stored in the PROM 64 of the baseband processor 20 to cause the software updating operation to be performed.

In alternate example embodiments, the OP codes in the wake-up and control interface 205 may be passed through to the baseband processor 20 where they are recognized. The utility programs in the baseband processor 20 corresponding to the OP codes, may then be executed in the baseband processor 20 to cause the corresponding information processing operations to be performed in the electronic product 200.

Figure 5B:
FIG. 5B is an example flow diagram 550 of example operational steps of an example embodiment of the method carried out by the baseband processor of FIG. 2C or FIG. 3C, according to an embodiment of the present invention.

FIG. 5B is an example flow diagram 550 of example operational steps of an example embodiment of the method carried out by the baseband processor 20 of FIG. 2C or FIG. 3C, according to an embodiment of the present invention. The steps of the flow diagram represent computer code instructions stored in the RAM and/or PROM memory of the baseband processor 20, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 552: receiving information from a wireless power receiver through a control interface; and Step 554: causing an information processing operation to be performed based on the received information.

Example embodiments of the invention include an apparatus comprising:

at least one processor, for example the CPU 60 in the baseband processor 20 of FIG. 2D;

at least one memory including computer program code, for example the RAM 62 or PROM 64 containing the programmed operations, in the baseband processor 20 of FIG. 2D;

the at least one memory and the computer program code configured to, with the at least one processor, cause the apparatus at least to:

receive information from a wireless power receiver through a control interface, for example the wake-up instructions stored in the wake-up and control interface 205, is information that is sent by the wake-up and control interface 205, in response to the wake-up and control interface 205 receiving the wireless power 110 from the power receiving coil 220 and rectifier and interface 212; and cause an information processing operation to be performed based on the received information; for example the CPU 60 may execute the wake-up instructions and may cause information to be stored in the PROM 64 of the baseband processor 20, to cause a software updating operation to be performed.

An example sequence of operations that may be performed by an example embodiment of the invention is a wake-up, personalization, and software update of the baseband processor 20 in a cell phone sealed in its product package. The example sequence is initiated by the server 55 via the modulated power frame 112 and continued by the server 55' via the Bluetooth™ transceiver 12B. The following table shows an example of a sequence of modulated power frames 112 to carry out this example operation:

| Op Code | Source Transponder | Data |
|---|---|---|
| 3—Personalization | | Cell Phone Number |
| 1—Software Update | | Contacts List |
| 2—Bluetooth™ Pairing | BT Transponder 12B | Handover Data |

Figure 6:
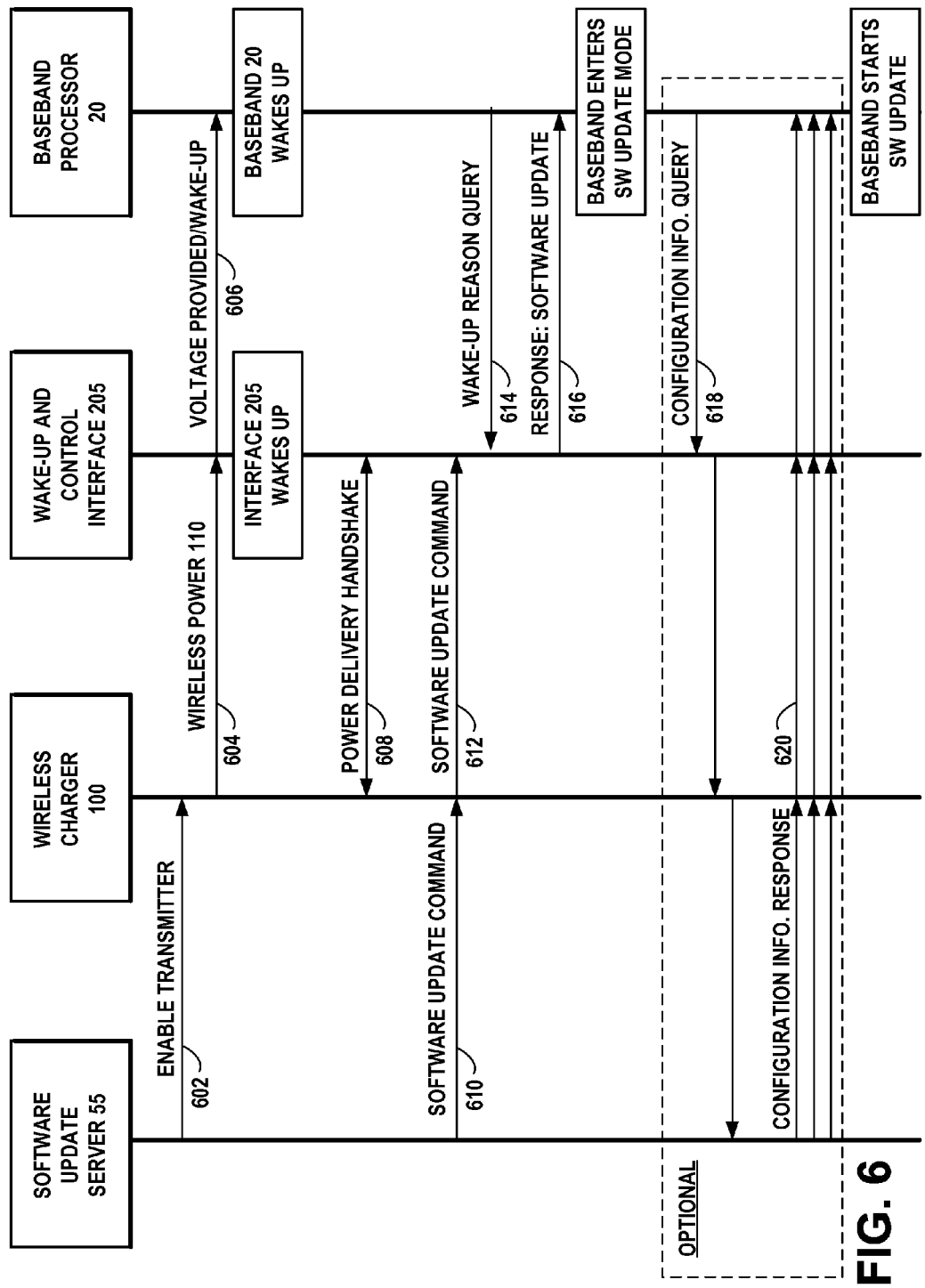
FIG. 6 is an example sequence diagram of the operation of the software update server, wireless charger, wake-up and control interface, and baseband processor of FIG. 1B, according to an embodiment of the present invention.

FIG. 6 is an example sequence diagram of the operation of the software update server 55, wireless charger 100B, wake-up and control interface 205, and baseband processor 20 of FIGS. 1 and 2A, according to an embodiment of the present invention. For example, when a software update of the baseband processor 20 is to take place while the wirelessly charged electronic product 200 is sealed in its package 65, the sequence may begin by the software update server 55 sending an enable transmitter signal 602 to the wireless charger 100B. For example, the wireless charger 100B may wake up and in response and may cause its power frequency driver and interface 104 to transmit at 604, the wireless power 110 to the wirelessly charged electronic product 200 where the wake-up and control interface 205 may detect the received power and wakes up. For example, the wake-up and control interface 205 may be energized by the wireless power 110 and recognize the wake-up code in the modulated power frame 112 as a command to cause the energy of the wireless power 110 to be applied at 606, to the baseband processor 20, thereby waking up the baseband processor. The wireless charger 100B and wake-up and control interface 205 may engage in a power delivery handshake at 608. The software update server 55 may send a software update command at 610 to the wireless charger 100B, which may be forwarded by the wireless charger 100B to the wake-up and control interface 205 at 612. The baseband processor 20, having been awakened, may send a query at 614, asking the wake-up and control interface 205 the reason for the wake-up event. The wake-up and control interface 205 may reply at 616 with a response that the reason is a software update. At this point, for example, the baseband processor 20 may enter into its software update mode and may start its software update. As an alternate option, after the baseband processor 20 enters the software update mode, it may send a configuration information query at 618, to the wake-up and control interface, which may be forwarded to the wireless charger 100B and the software update server 55. The software update server 55 may reply with a configuration information response at 620. Thereafter, in this alternate option, for example, the baseband processor 20 may start its software update.

During the software update, power is provided from the wireless charger 100B. Once the update is completed, either the wake-up and control interface 205 or the baseband processor 20 may inform the wireless charger 100B of the completion so that it may turn off the power 110. This communication back to the wireless charger 100B may be by load modulation of the power 110 or through a backbone link to the wireless charger 100B.

In an example embodiment, the product package 65 may enclose or protect the electronic product 200 for distribution, storage, sale, and/or use. In an example embodiment, the product package 65 may be a prefabricated container, such as a cardboard carton that may have a transparent cellophane overwrap and panel on the carton. In an example embodiment, the product package 65 may be pre-formed plastic packaging that may form a cavity or pocket made from a thermoformed plastic, such as, for example, polyvinyl chloride, polyethylene, or the like. In an example embodiment, the product package 65 may be a shrink wrap polymer plastic film applied directly to the electronic product 200. The thickness and composition of the wall of the product package 65 may be such as to be permeable to the wireless power 110. The product package 65 may be a primary package that first envelops the product and directly holds it and which is surrounded by secondary packaging such as a cardboard shipping container used to group a plurality of primary packages 65 together for warehouse storage and transport shipping. It may be beneficial to enable programmed operations to be performed on the electronic device sealed in a primary package 65 while is surrounded by secondary packaging such as a cardboard shipping container, without disturbing the integrity of the package.

The product package 65 may be a primary package that first envelops the product 200 and directly holds it and which is surrounded by secondary packaging such as a cardboard shipping container used to group a plurality of primary packages 65 together for warehouse storage and transport shipping. In example embodiments of the invention, it may be beneficial to enable programmed operations to be performed on the electronic device 200 sealed in a primary package 65 while is surrounded by secondary packaging such as a cardboard shipping container, without disturbing the integrity of the package 65 or that of the shipping container. In example embodiments of the invention, all of the plurality of products 200 contained in such a secondary package shipping container may be awakened in unison by the wireless power 110. In example embodiments of the invention, the programmed operations may be performed in unison on all of the products 200 by the modulated power frame 112, such as setting of the language selection to the national language of the country where the products are to be sold. In example embodiments of the invention, the programmed operations may be performed on an individual selected one of the plurality of products 200 contained in such a secondary package shipping container by including a unique product address or other identification value in the modulated power frame 112 that may be uniquely recognized by the baseband processor 20 of the selected one of the plurality of products 200.

Connection Formation Between Bluetooth™ Devices

In example embodiments of the invention, the awakened device may be wirelessly controlled through the sealed package, to cause programmed operations to be performed, such as Bluetooth™ pairing between the Bluetooth™ transceiver 12B and the Bluetooth™ transceiver 82 coupled to the software update server 55'. The procedure for forming connections between Bluetooth™ devices is described in the *Bluetooth™ Specification*, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation includes inquiry, inquiry scanning, paging, and page scanning procedures. Inquiry is a procedure where a Bluetooth™ device transmits inquiry messages and listens for responses in order to discover the other Bluetooth™ devices that are within the coverage area. Inquiry scan is a procedure where a Bluetooth™ device listens for inquiry messages received on its inquiry scan physical channel. Page is the initial phase of the connection procedure where a device transmits a train of page messages until a response is received from the target device or a timeout occurs. Page scan is a procedure where a device listens for page messages received on its page scan physical channel.

In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ device address and the clock of the slave device.

In the paging procedure, one the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ device address BD_ADDR to identify communications on the channel. The page scan channel uses a slower hopping rate than the hop rate of the paging device, using the Bluetooth™ device clock of the scanning device as an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet.

An example of Bluetooth™ pairing is Bluetooth™ Secure Simple Pairing that is described, for example, in the *Bluetooth™ Core Specification*, (Jun. 30, 2010) v2.1, incorporated herein by reference, to exchange IO capabilities, authentication requirements, and other information. Secure Simple Pairing uses a form of public key cryptography to ensure a secure Bluetooth™ connection. In an example out-of-band mode, the NFC transceiver 12C of the electronic product 200 may optionally be used to exchange a numeric code passkey with the NFC transceiver 80 coupled to the software update server 55', when the NFC transceivers are positioned close to each other, to enable Bluetooth™ Simple Pairing. Pairing is completed using the Bluetooth™ transceivers 12B and 82.

II. Remote Wireless Powering and Control with Received Power from Near Field Communication Device Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection, which is then compatible with other known wireless technologies, such as Bluetooth™ or wireless local area network (WLAN).

Near-field communication (NFC) technology communicates between two NFC Devices or between an NFC Device and an NFC Tag via magnetic field induction, where two loop antennas are located within each other's near field, effectively energizing a wireless contact by forming an air-core transformer. An example NFC radio operates within the unlicensed radio frequency industrial, scientific, and medical (ISM) band of 13.56 MHz, with a bandwidth of approximately 2 MHz over a typical distance of a few centimeters. The NFC radio may be affixed to a wireless client device and the user brings the NFC radio on the device close to another NFC device to allow near field communication between the devices.

NFC technology is an extension of the ISO/IEC 14443 proximity-card standard (incorporated herein by reference) for contactless smartcards and radio frequency ID (RFID) devices, which combines the interface of a contactless smartcard and a reader into a single device, and uses the ISO/IEC 18092 NFC communication standard (incorporated herein by reference) to enable two-way communication. An NFC radio may communicate with both existing ISO/IEC 14443 contactless smartcards and readers, as well as with other NFC devices by using ISO/IEC 18092. The NFC Forum™, a non-profit industry association, has released specifications that enable different operation modes called: tag emulation, read/write mode, and peer to peer communication. Furthermore, NFC Forum has defined specifications for NFC Data Exchange Format (NDEF), NFC Tag Types, NFC Record Type Definition, and Connection Handover Specification. See, for example, *Connection Handover Technical Specification*, NFC Forum™, Connection Handover 1.2, NFCForum-TS-ConnectionHandover_1.2, 2010 Jul. 7 (incorporated herein by reference). The ISO/IEC 18092 standard defines communication modes for Near Field Communication Interface and Protocol (NFCIP-1) using inductively coupled devices operating at the center frequency of 13.56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

The NFC Data Exchange Format (NDEF) specification, *NFC Forum Data Exchange Format (NDEF) Specification*, NFC Forum™, 2006 (incorporated herein by reference), defines a common data format for NFC devices to exchange application or service specific data. An NDEF message is constructed of a number of NDEF records, with the first and the last record providing message begin and end markers. Between two NFC Devices, NDEF messages may be exchanged over the NFC Logical Link Control Protocol (LLCP) protocol, specified in *NFC Forum Logical Link Control Protocol Specification*, NFC Forum™, 2009 (incorporated herein by reference). The NFC Connection Handover specification, *NFC Forum Connection Handover Specification*, NFC Forum™, Jul. 7, 2007 (incorporated herein by reference), defines the exchange of NDEF messages between two NFC Devices in a negotiated handover to discover and negotiate alternative wireless communication technologies.

FIG. 3A illustrates an example embodiment of the electronic product 200' contained in the product package 65 and a near field communication circuit 75 providing near field communication messages to the electronic product 200' through the product package 65, the electronic product wirelessly coupled to one or more of a Bluetooth™ transceiver 82 or a WLAN transceiver 84 coupled to a software update server 55', to provide a communications connection with additional information 86 to control the electronic product 200', in accordance with example embodiments of the invention.

In an example embodiment, when it is desired to provide software update information or other forms of updating or initialization information to the electronic product 200' while it is sealed in its product package 65, the electronic product needs to first be awakened. The NFC circuit 75 may be brought near the NFC circuit 77 of the electronic product 200', to transfer an NFC frame 112' to the NFC circuit 77, which may provide sufficient power to operate the electronic product 200'. The wake-up and control interface 205' in the electronic product 200', may include stored information, for example, wake-up instructions that are output to the baseband processor 20 in response to detecting the received NFC frame 112'. The wake-up and control interface 205 may provide the wake-up instructions to the baseband system 20, transceiver 12, and other needed components of the electronic product 200'. In example embodiments, the absence of a battery in the battery holder 216, along with detecting the received NFC frame 112', may be used as an indication to the wake-up and control interface 205 that the wake-up information may be invoked. In other example embodiments, the detecting of the received NFC frame 112', may be used as an indication to the wake-up and control interface 205 that the wake-up information may be invoked, even though a battery may be present in the battery holder 216.

In an example embodiment, then the software update server 55' may provide software update information or other forms of updating or initialization information, to the Bluetooth™ connection 82 or the WLAN connection 84 as additional instructions 86. The additional information 86 may be transmitted to the transceiver 12 of the electronic product 200'. The additional information 86 may pass through the wake-up and control interface 205 to provide the software update information to the baseband system 20 of the electronic product 200. The electronic product 200' may then be wirelessly controlled through its sealed package, to cause programmed operations to be performed, such as software updating, Bluetooth™ pairing, personalization, and various types of settings.

In example embodiments of the invention, transceiver 12 of the electronic product 200' contained in the product package 65 of FIG. 3A, may use a suitable short-range communications protocol, such as Bluetooth™, Radio Frequency Identification (RFID), Near Field Communication (NFC), Infrared Data Association (IrDA), Ultra Wide Band (UWB), or IEEE 802.11 WLAN, for example, that is respectively wirelessly coupled to a corresponding transceiver of the same type coupled to the software update server 55'.

An example of the Bluetooth™ out-of-band short-range carrier is described, for example, Bluetooth™ devices is described in the *Bluetooth™ Specification*, Version 4, Jun. 30, 2010, incorporated herein by reference.

An example of the Radio Frequency Identification (RFID) out-of-band short-range carrier is described, for example, ISO 11785 (air interface protocol), ISO 14443 (air interface protocol), and ISO 15693, incorporated herein by reference.

An example of the Near Field Communication (NFC) out-of-band short-range carrier is described, for example, in ISO/IEC 14443 and ISO/IEC 18092, incorporated herein by reference.

An example of the Infrared Data Association (IrDA) out-of-band short-range carrier is described, for example, in *IrDA Link Access Protocol*, v1.1 (1996), incorporated herein by reference.

An example of the Ultra Wide Band (UWB) out-of-band short-range carrier is described, for example, in *WiMedia Common Radio Platform Specification*, Version 1.5 (2010), incorporated herein by reference.

An example of the IEEE 802.11 WLAN out-of-band carrier is described, for example, in *IEEE 802.11-2007, Wireless Medium Access Control (MAC) and Physical Layer (PHY) Specifications*, June 2007 (incorporated herein by reference).

The electronic product 200' may be primarily a communications device, such as a cell phone, PDA, pager, Bluetooth™ headset, or the like. The electronic product 200' may also be a personal computing device such as a laptop, palmtop, or tablet computer. The electronic product 200' may also be an embedded micro-controller in an appliance, an engine control computer, a micro-controller in a digital TV, a micro-controller in a GPS device, or the like. The electronic product 200' may also be a video game console or a digital toy, such as a programmable robot.

FIG. 3B illustrates an example embodiment of the wake-up and control interface 205' in the electronic product 200' of FIG. 3A, in accordance with example embodiments of the invention. The wake-up and control interface 205' may include the control 250 that includes the CPU 260, the RAM 262, and the PROM 264. The PROM 264 may store programmed operations and data source addresses. In an example embodiment, when it is desired to provide software update information or other forms of updating or initialization information to the electronic product 200 while it is sealed in its product package 65, the electronic product needs to first be awakened. The NFC circuit 75 may be brought near the NFC circuit 77 of the electronic product 200', to transfer an NFC frame 112' to the NFC circuit 77, which may provide sufficient power to operate the electronic product 200'. The wake-up and control interface 205' in the electronic product 200', may include stored information, for example, wake-up instructions, that are output to the baseband processor 20 in response to detecting the received NFC frame 112'. The wake-up and control interface 205 may provide the wake-up instructions to the baseband system 20, transceiver 12, and other needed components of the electronic product 200.

FIG. 3C illustrates an example embodiment of the baseband processor 20 in the electronic product 200' of FIG. 3B, in accordance with example embodiments of the invention. The baseband processor 20 may include the CPU 60, RAM 62, PROM 64, and input buffer 265 that may be coupled to the wake-up and control interface 205'. The PROM 64 may store programmed operations including, for example, a wake-up utility program, a query/response utility program, a software update utility program, a personalization utility program, and a parameter setting utility program. In an example embodiment, the baseband processor 20 may be embodied on a single integrated circuit semiconductor chip, known as a baseband system on chip. In an alternate example embodiment, the baseband processor 20 may be embodied on two or more integrated circuit semiconductor chips in a chip set.

In an example embodiment where the electronic product 200' may be primarily a communications device, such as for example a cell phone, PDA, pager, or Bluetooth™ headset, the baseband processor 20 may manage the communication functions of the electronic product 200. Example communication functions may be radio control functions such as signal modulation, encoding, radio frequency shifting, and the like. These communication functions may be based on baseband programming instructions stored as firmware in the PROM 64. In accordance with an example embodiment of the invention, the baseband programming may be wirelessly updated and various settings stored in the baseband processor 20, without disturbing the integrity of its sealed product package 65.

In an alternate example embodiment where the electronic product 200' may be a laptop, palmtop, or tablet computer, or the like, the baseband processor 20 may be a microprocessor and its system software may be stored in the PROM 64 as firmware. In accordance with an example embodiment of the invention, the system software may be wirelessly updated and various settings stored in the PROM 64 and/or microprocessor, without disturbing the integrity of its sealed product package 65.

In an alternate example embodiment where the electronic product 200' may be an embedded micro-controller in an appliance, in an engine, in a digital TV, in a video game console, in a programmable robot, or the like, the baseband processor 20 may be the micro-controller and its system software may be stored in the PROM 64 as firmware. In accordance with an example embodiment of the invention, the system software may be wirelessly updated and various settings stored in the PROM 64 and/or micro-controller, without disturbing the integrity of its sealed product package 65.

In an example embodiment, the wake-up and control interface 205 in the electronic product 200', may include stored information, for example, wake-up instructions, that are output to the baseband processor 20 in response to detecting the received NFC frame 112'. The wake-up and control interface 205' may provide the wake-up instructions to the baseband system 20, transceiver 12, and other needed components of the electronic product 200.

The Bluetooth™ transceiver 82 or WLAN transceiver 84 coupled to a software update server 55' in FIG. 3A, may provide additional information to control the electronic product, in accordance with example embodiments of the invention. The wake-up and control interface 205' may wirelessly download additional software update information or other forms of updating or initialization information from the Bluetooth™ transceiver 82 and WLAN transceiver 84, from the software update server 55'. This information may be then sent by wake-up and control interface 205' to the baseband processor 20. The CPU 60 of the baseband processor 20 may cause to be stored the example received software update information in the PROM 64, using the software update utility program.

Figure 3D:
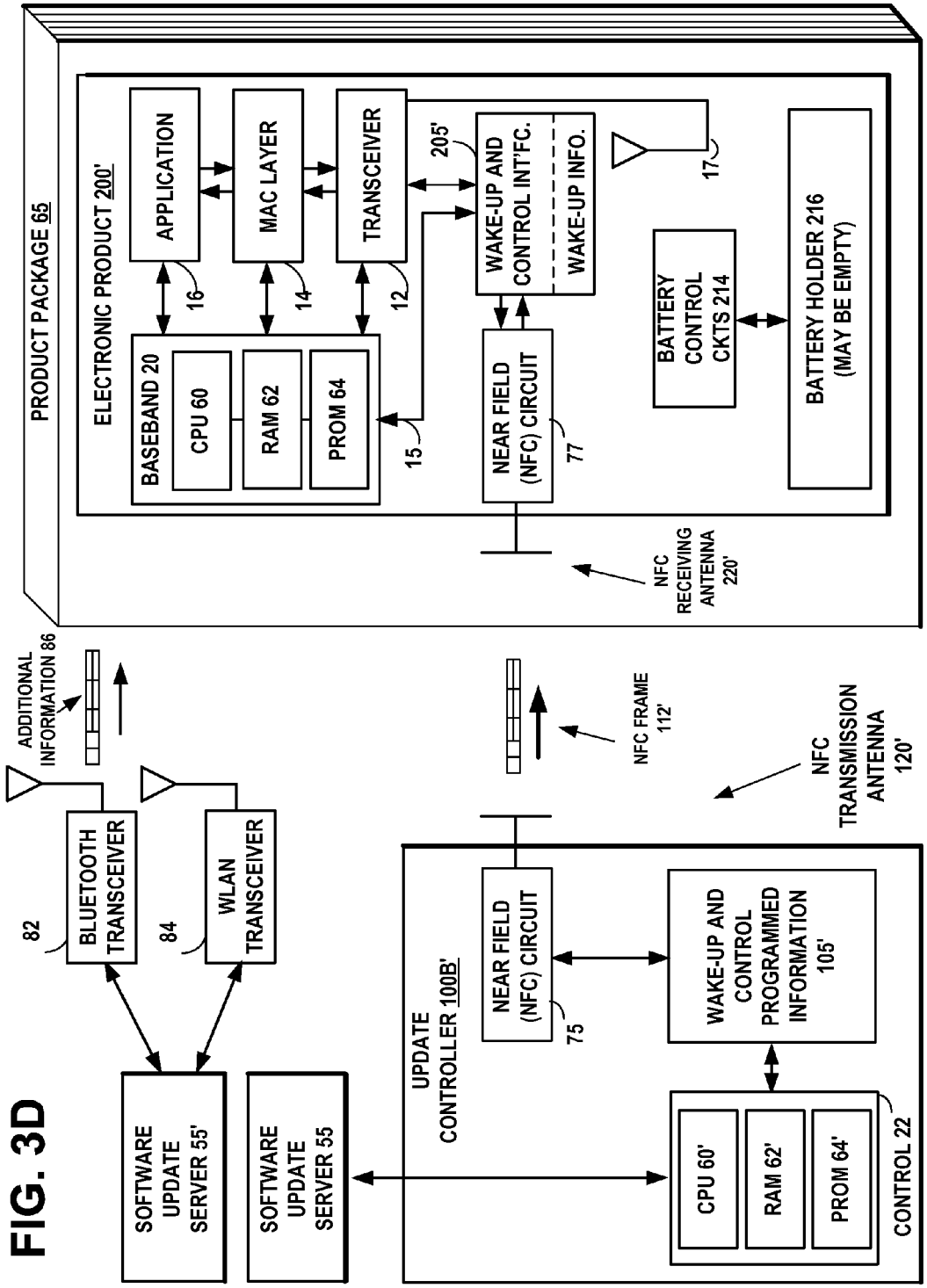
FIG. 3D illustrates an example embodiment of an electronic product contained in a product package and a near field communication circuit providing near field communication messages to the product through the product package, the near field communication messages including information in a frame to enable wake-up and control of the product, and a communications connection with additional information to control the electronic product, in accordance with example embodiments of the invention.

FIG. 3D illustrates an example embodiment of an electronic product 200' contained in a product package 65 and a near field communication circuit 75 providing near field communication messages to the electronic product 200' through the product package, the near field communication messages including information in a frame 112' to enable wake-up and control of the electronic product 200', and a communications connection with additional instructions 86 to control the electronic product 200', in accordance with example embodiments of the invention.

FIG. 3D illustrates an example embodiment of the update controller 100B' coupled to a software update server 55, in accordance with example embodiments of the invention. The update controller 100B' may be a cellular telephone, for example, equipped with an NFC circuit 75. The software update server 55 may provide software update information or other forms of updating or initialization information, to the control 22 of the update controller 100B'. The control 22 may include a CPU 60', RAM 62', and PROM 64'. The PROM 64' may store wake-up and control programmed instructions 105'. The wake-up and control programmed instructions 105' and the software update information from the server 55 may be input to the near field communication circuit 75 to, to enable the transmission of binary information in NFC frames 112' to the near field communication circuit 77 of the electronic product 200'. When it is desired to provide software update information or other forms of updating or initialization information to the electronic product 200' while it is sealed in its product package 65, the electronic product needs to first be awakened.

In example embodiments, the NFC frame 112' may include a wake-up code that is recognized by the wake-up and control interface 205' in the electronic product 200'. The wake-up and control interface 205' may then provide wake-up signals to the baseband system 20, transceiver 12, and other needed components of the electronic product 200'.

In example embodiments, then the software update server 55 may provide software update information or other forms of updating or initialization information, to the control 22 of the update controller 100B'. The control programmed instructions 105' and the software update information from the server 55 may then be incorporated as control and data in the transmitted NFC frames 112' that bear that information to the near field communication circuit 77 of the electronic product 200'. The near field communication circuit 75 may include in the NFC frames 112' control programmed instructions 105 and the software update information that is processed by the wake-up and control interface 205' in the electronic product 200'. The wake-up and control interface 205' may then provide the software update information to the baseband system 20, transceiver 12, and other needed components of the electronic product 200. The electronic product 200' may then be wirelessly controlled through its sealed package, to cause programmed operations to be performed, such as software updating, Bluetooth™ pairing, personalization, and various types of settings.

In an example embodiment, when it is desired to provide software update information or other forms of updating or initialization information to the electronic product 200' while it is sealed in its product package 65, the electronic product needs to first be awakened. The NFC circuit 75 may provide sufficient power to operate the electronic product 200'. The wake-up and control interface 205' in the electronic product 200', may include stored information, for example, wake-up instructions that are output to the baseband processor 20 in response to detecting the received NFC frame 112'. The wake-up and control interface 205' may provide the wake-up instructions to the baseband system 20, transceiver 12, and other needed components of the electronic product 200'. In example embodiments, the absence of a battery in the battery holder 216, along with detecting the received NFC frame 112', may be used as an indication to the wake-up and control interface 205 that the wake-up information may be invoked. In other example embodiments, the detecting of the received NFC frame 112', may be used as an indication to the wake-up and control interface 205 that the wake-up information may be invoked, even though a battery may be present in the battery holder 216.

In an example embodiment, then the software update server 55' may provide software update information or other forms of updating or initialization information, to the Bluetooth™ connection 82 or the WLAN connection 84 as additional information 86. The additional instructions 86 may be transmitted to the transceiver 12 of the electronic product 200'. The additional instructions 86 may pass through the wake-up and control interface 205' to provide the software update information to the baseband system 20 of the electronic product 200'. The electronic product 200 may then be wirelessly controlled through its sealed package, to cause programmed operations to be performed, such as software updating, Bluetooth™ pairing, personalization, and various types of settings.

FIG. 4B illustrates an example embodiment of the near field communication message frame 112' of FIG. 3A, including information to enable wake-up and control of the electronic product 200', in accordance with example embodiments of the invention. The NFC frame 112' may include a field for a wake-up code. The NFC frame 112' includes a field for the OP Code indicating the desired data processing operation. The NFC frame 112' includes a field for indicating the data source for wirelessly downloaded additional software update information or other forms of updating or initialization information. And the NFC frame 112' includes data to pass through the interface 205' to the baseband processor 20.

In example embodiments, example OP Codes in the NFC frame 112' indicating the desired data processing operation include the following example codes and operations:

| Op Code | Operation |
|---|---|
| 1 | Software Updating |
| 2 | Bluetooth ™ Pairing |
| 3 | Personalization |
| 4 | Operator Settings |
| 5 | User Settings |
| 6 | Language Settings |
| 7 | Voice Settings. |

In example embodiments, example data sources in the NFC frame 112' indicating the source for wirelessly downloaded additional software update information or other forms of updating or initialization information, include the following example data source codes and sources:

| Data Source Code | Source Address |
|---|---|
| 1 = NFC | NFC Circuit 77 |
| 2 = Bluetooth ™ | Transceiver 12B |
| 3 = WLAN | Transceiver 12A |

In example embodiments, these OP codes and data source codes are recognized by the wake-up and control interface 205' in the electronic product 200'. The wake-up and control interface 205' may then send the information through the control interface 205' to cause the corresponding information processing operation to be performed in the electronic product 200'.

In alternate example embodiments, these OP codes and data source codes may be passed through to the baseband processor 20 where they are recognized. The utility programs in the baseband processor 20 corresponding to the OP codes, may then be executed in the baseband processor 20 to cause the corresponding information processing operations to be performed in the electronic product 200'.

Example embodiments of the invention include an apparatus comprising:

at least one processor, for example the CPU 260 in the wake-up and control interface 205' of FIG. 3C;

at least one memory including computer program code, for example the RAM 262 or PROM 264 containing the programmed operations and data source addresses, in the wake-up and control interface 205' of FIG. 3C;

the at least one memory and the computer program code configured to, with the at least one processor, cause the apparatus at least to:

detect received power in a wireless power receiver, for example the NFC frame 112' is detected by the wake-up and control interface 205' via the NFC circuit 77 of FIG. 3C;

determine to turn on the apparatus in response to detecting the power, for example the wake-up and control interface 205' is energized by the NFC frame 112' and causes the energy of the NFC frame 112' to be applied to various components of the electronic product 200'; and send information through a control interface to cause an information processing operation to be performed, for example the wake-up and control interface 205' responds to the detected power by sending the wake-up instructions stored in the wake-up and control interface 205' to its output buffer 255 to be forwarded to the baseband processor 20, to cause the wake-up instructions to be executed by the CPU 60 and/or information to be stored in the PROM 64 of the baseband processor 20 to cause the software updating operation to be performed.

In alternate example embodiments, the OP codes in the wake-up and control interface 205 may be passed through to the baseband processor 20 where they are recognized. The utility programs in the baseband processor 20 corresponding to the OP codes, may then be executed in the baseband processor 20 to cause the corresponding information processing operations to be performed in the electronic product 200.

Example embodiments of the invention include an apparatus comprising:

at least one processor, for example the CPU 60 in the baseband processor 20 of FIG. 3D;

at least one memory including computer program code, for example the RAM 62 or PROM 64 containing the programmed operations, in the baseband processor 20 of FIG. 3D;

the at least one memory and the computer program code configured to, with the at least one processor, cause the apparatus at least to:

receive information from a wireless power receiver through a control interface, for example the wake-up instructions stored in the wake-up and control interface 205, is information that is sent by the wake-up and control interface 205, in response to the wake-up and control interface 205 receiving the NFC frame 112'; and cause an information processing operation to be performed based on the received information; for example the CPU 60 may execute the wake-up instructions and may cause information to be stored in the PROM 64 of the baseband processor 20, to cause a software updating operation to be performed.

In example embodiments, an example sequence of operations that may be performed by an example embodiment of the invention is a wake-up, personalization, and software update of the baseband processor 20 in a cell phone sealed in its product package. The example sequence is initiated by the server 55 in FIG. 3A, via the NFC frame 112' and continued by the server 55' via the Bluetooth™ transceiver 12B in FIG. 3B. The following table shows an example of a sequence of NFC frames 112' of FIG. 4B to carry out this example operation:

| Op Code | Source Transponder | Data |
|---|---|---|
| 3—Personalization | | Cell Phone Number |
| 1—Software Update | | Contacts List |
| 2—Bluetooth ™ Pairing | BT Transponder 12B | Handover Data |

Connection Formation Between Bluetooth™ Devices

In example embodiments of the invention, the awakened device may be wirelessly controlled through the sealed package, to cause programmed operations to be performed, such as Bluetooth™ pairing between the Bluetooth™ transceiver 12B and the Bluetooth™ transceiver 82 coupled to the software update server 55'. The procedure for forming connections between Bluetooth™ devices is described in the *Bluetooth™ Specification*, Version 4, Jun. 30, 2010, as discussed above.

An example of Bluetooth™ pairing is Bluetooth™ Secure Simple Pairing that is described, for example, in the *Bluetooth™ Core Specification*, (Jun. 30, 2010) v2.1, incorporated herein by reference, to exchange IO capabilities, authentication requirements, and other information. Secure Simple Pairing uses a form of public key cryptography to ensure a secure Bluetooth™ connection. In an example out-of-band mode, the NFC transceiver 77 of the electronic product 200' may optionally be used to exchange a numeric code passkey with the NFC transceiver 80 coupled to the software update server 55', when the NFC transceivers are positioned close to each other, to enable Bluetooth™ Simple Pairing. Pairing is completed using the Bluetooth™ transceivers 12B and 82.

Connection Formation Between WLAN Devices

In example embodiments of the invention, the awakened device may be wirelessly controlled through the sealed package, using the WLAN transceiver 12A and the WLAN transceiver 84 coupled to the software update server 55'. The procedure for forming connections between IEEE 802.11 WLAN devices is described in the IEEE 802.11 standard, as discussed above.

Figure 7A:
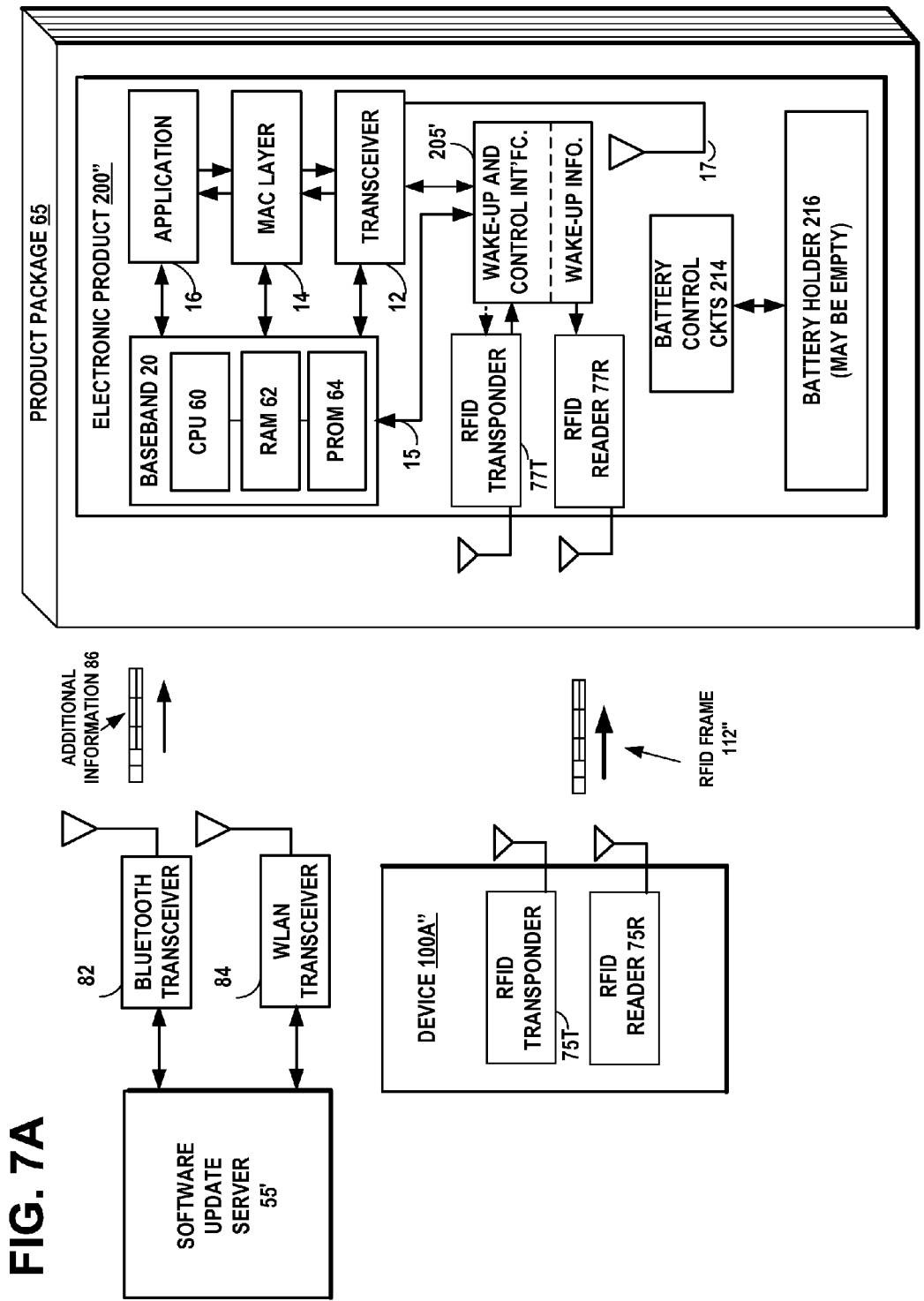
FIG. 7A illustrates an example embodiment of an electronic product contained in a product package and a device with a radio frequency identification (RFID) circuit providing messages to the product through the product package, the RFID messages including information in a frame to enable wake-up of the product, and including a communications connection with additional information to control the electronic product, in accordance with example embodiments of the invention.

III. Remote Wireless Powering and Control with Received Power from Radio Frequency Identification (RFID) Device FIG. 7A illustrates an example embodiment of an electronic product 200" contained in a product package 65 and a device 100A" with a radio frequency identification (RFID) circuit 75T and 75R, providing RFID messages to the product through the product package, the RFID messages including information in a frame 112" to enable wake-up of the product, and including a communications connection 82 and 84 with additional information 86 to control the electronic product 200", in accordance with example embodiments of the invention. An example embodiment of the electronic product 200" is contained in the product package 65. The device 100A" may include a radio frequency identification (RFID) reader 75R providing RFID messages to the product 200" through the product package 65, the RFID messages including information in a RFID frame 112" to enable wake-up and control of the product, in accordance with example embodiments of the invention.

In example embodiments of the invention, the RFID transponder 75T and the RFID reader 75R as shown in FIG. 7A, may be associated or combined as a single component. The RFID transponder 75T and RFID reader 75R may be capable of two-way communication to enable both the electronic product 200" contained in the product package 65 and the device 100A" to send messages to each other through the sealed product package 65, according to an embodiment of the present invention. The electronic product 200" may contain an RFID transponder 77T and an RFID reader 77R, as shown in FIG. 7A, which may be associated or combined as a single component.

In an example embodiment, when it is desired to provide software update information or other forms of updating or initialization information to the electronic product 200" while it is sealed in its product package 65, the electronic product needs to first be awakened. The RFID reader 75R may within range of the electronic product 200" to transmit an RFID frame 112" to the RFID transponder 77T of the electronic product 200". The RFID frame 112" may provide sufficient power to operate the electronic product 200". The wake-up and control interface 205' in the electronic product 200", may include stored information, for example, wake-up instructions that are output to the baseband processor 20 in response to detecting the RFID frame 112". The wake-up and control interface 205 may provide the wake-up instructions to the baseband system 20, transceiver 12, and other needed components of the electronic product 200". In example embodiments, the absence of a battery in the battery holder 216, along with detecting the received RFID frame 112", may be used as an indication to the wake-up and control interface 205' that the wake-up information may be invoked. In other example embodiments, the detecting of the received RFID frame 112", may be used as an indication to the wake-up and control interface 205 that the wake-up information may be invoked, even though a battery may be present in the battery holder 216.

In an example embodiment, then the software update server 55' may provide software update information or other forms of updating or initialization information, to the Bluetooth™ connection 82 or the WLAN connection 84 as additional information 86. The additional information 86 may be transmitted to the transceiver 12 of the electronic product 200". The additional information 86 may pass through the wake-up and control interface 205' to provide the software update information to the baseband system 20 of the electronic product 200". The electronic product 200" may then be wirelessly controlled through its sealed package, to cause programmed operations to be performed, such as software updating, Bluetooth™ pairing, personalization, and various types of settings.

Figure 7B:
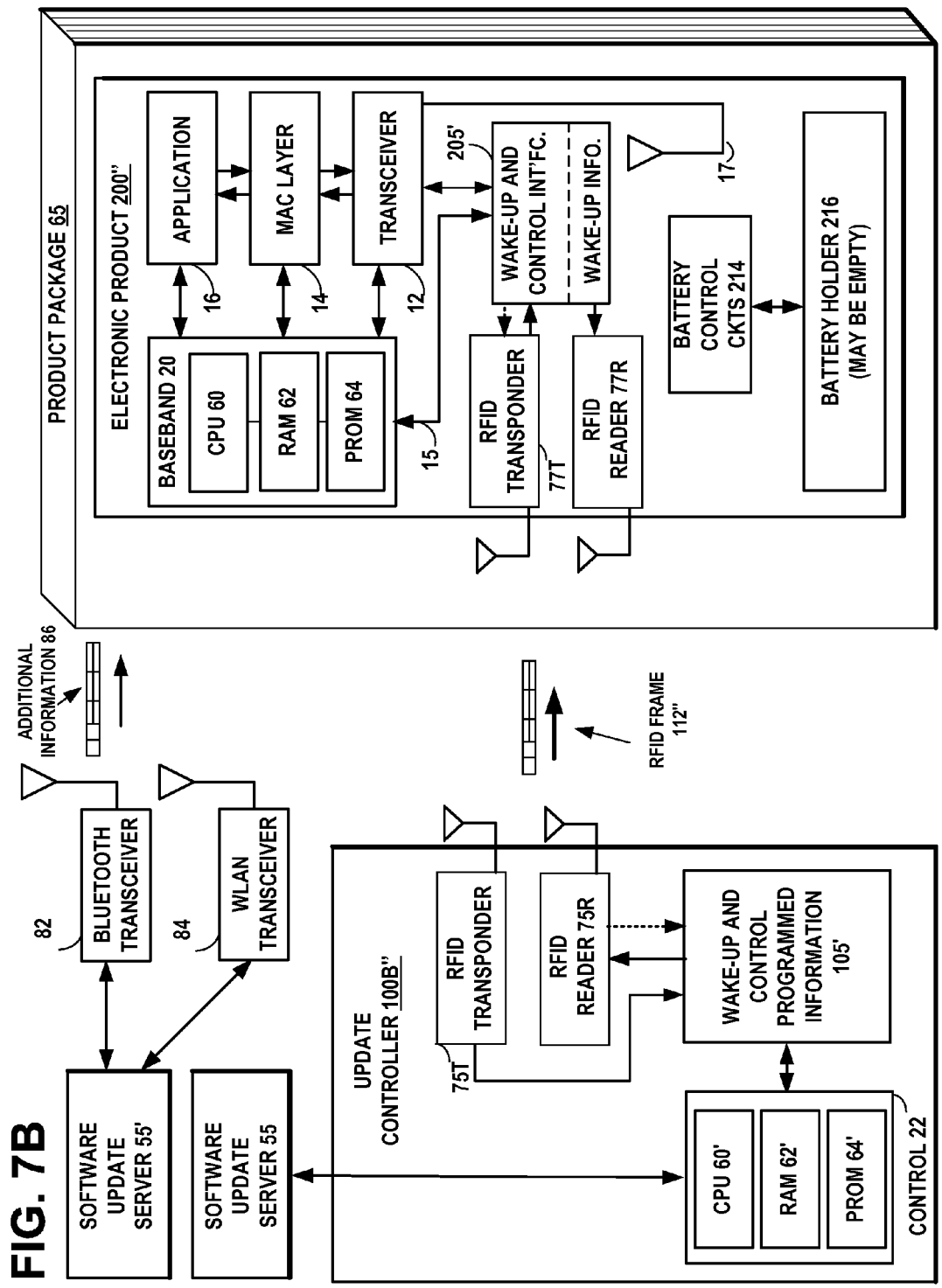
FIG. 7B illustrates an example embodiment of an electronic product contained in a product package and a device with a radio frequency identification (RFID) circuit providing messages to the product through the product package, the RFID messages including information in a frame to enable wake-up and control of the product, and including a communications connection with additional information to control the electronic product, in accordance with example embodiments of the invention.

FIG. 7B illustrates an example embodiment of an electronic product 200" contained in a product package 65 and an update controller 100B" with a radio frequency identification (RFID) circuit providing messages to the product through the product package, the RFID messages including information in a frame to enable wake-up and control of the product, and including a communications connection with additional instructions to control the electronic product, in accordance with example embodiments of the invention. In an example embodiment, the update controller 100B" may include a radio frequency identification (RFID) reader 75R providing RFID messages to the product 200" through the product package 65, the RFID messages including information in a RFID frame 112" to enable wake-up and control of the product, in accordance with example embodiments of the invention.

In an example embodiment, the wake-up and control programmed instructions 105' and the software update information from the server 55 may be input to the RFID reader 75R in the update controller 100B", to enable the transmission of binary information in RFID frames 112" to the RFID transponder 77T of the electronic product 200". The RFID transponder 77T of the electronic product 200" may pass the information in the RFID frame 112" to the wake-up and control interface 205'.

In an example embodiment, when it is desired to provide software update information or other forms of updating or initialization information to the electronic product 200" while it is sealed in its product package 65, the electronic product needs to first be awakened. The RFID reader 75R may within range of the electronic product 200" to transmit an RFID frame 112" to the RFID transponder 77T of the electronic product 200". The RFID frame 112" may provide sufficient power to operate the electronic product 200". The wake-up and control interface 205' in the electronic product 200", may include stored information, for example wake-up instructions that are output to the baseband processor 20 in response to detecting the RFID frame 112". The wake-up and control interface 205 may provide the wake-up instructions to the baseband system 20, transceiver 12, and other needed components of the electronic product 200". In example embodiments, the absence of a battery in the battery holder 216, along with detecting the received RFID frame 112", may be used as an indication to the wake-up and control interface 205' that the wake-up information may be invoked. In other example embodiments, the detecting of the received RFID frame 112", may be used as an indication to the wake-up and control interface 205 that the wake-up information may be invoked, even though a battery may be present in the battery holder 216.

In an example embodiment, then the software update server 55' may provide software update information or other forms of updating or initialization information, to the Bluetooth™ connection 82 or the WLAN connection 84 as additional information 86. The additional instructions 86 may be transmitted to the transceiver 12 of the electronic product 200". The additional information 86 may pass through the wake-up and control interface 205' to provide the software update information to the baseband system 20 of the electronic product 200". The electronic product 200" may then be wirelessly controlled through its sealed package, to cause programmed operations to be performed, such as software updating, Bluetooth™ pairing, personalization, and various types of settings.

RFID transponders may be the passive type or the active type. A passive RFID transponder 77T requires no internal power source to communicate with the RFID reader 75R, and is only active when it is near an RFID reader 75R, which energizes the transponder 77T with a continuous radio frequency signal at a resonant frequency of the transponder's antenna. The small electrical current induced in the transponder's antenna by the continuous radio frequency signal provides enough power for the integrated circuit in the transponder to power up and transmit a modulated response, typically by backscattering the continuous carrier wave received from the RFID reader 75R. A passive RFID transponder 77T may include writable electrically erasable, programmable, read-only memory (EEPROM) for storing data received from the RFID reader 75R, which modulates the continuous carrier wave sent by the RFID reader 75R. The RFID transponder 77T of the electronic product 200" may pass the information in the RFID frame 112" to the wake-up and control interface 205'.

Load modulation may be used by the RFID transponder 77T of the electronic product 200" to transmit information back to the RFID reader 75R of the update controller 100B". The load modulation may occur while power is being wirelessly provided to the electronic product 200" by the RFID reader 75R. No battery power may be required by the RFID transponder 77T in using load modulation for communication back to the RFID reader 75R.

Reading distances for passive RFID transponders typically range from a few centimeters to a few meters, depending on the radio frequency and antenna design. By contrast, active RFID transponders require a power source to receive and transmit information with an RFID reader. The RFID transponder 77T may be a passive transponder affixed to the electronic product 200". The user may bring the RFID transponder 77T close to the RFID reader 75R to allow RFID communication between the devices.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
 receiving wireless power in a wireless power receiver and detecting receipt of the wireless power in a control interface of a device;
 determining to turn on the device in response to detecting the wireless power;
 providing wake-up information by the control interface, to a processor in the device, in response to detecting the wireless power;
 receiving, as a modulated component of the wireless power, instructions for receiving software update information via a wireless communications connection, the modulated component further including a field indicating a wireless communications source for wirelessly downloading the software update information; and
 receiving the software update information via the wireless communications connection to the wireless communications source indicated in the field of the modulated component of the wireless power, sending the software update information through the control interface, and storing the received software update information in the device using a software update utility program stored in the device, to cause the processor in the device to receive the software update information while operating on the received wireless power.

2. The method of claim 1, wherein the received power is received from a wireless charging device.

3. The method of claim 1, wherein the received power is received from a near field communication device.

4. The method of claim 1, wherein instructions are received as a modulated component of the received power.

5. The method of claim 1, wherein instructions are received in a near field communication message received by the wireless power receiver.

6. The method of claim 1, wherein instructions are stored in the device.

7. The method of claim 1, wherein instructions are stored in the device and receiving wireless power causes the instructions to be sent through the control interface to cause an information processing operation to be performed.

8. The method of claim 1, further comprising:
receiving additional information via a wireless communications connection; and
using the additional information to cause the information processing operation to be performed.

9. The method of claim 1, further comprising:
receiving additional information from at least one of a Bluetooth™ connection or a wireless local area network connection; and
using the additional information to cause an information processing operation to be performed.

10. The method of claim 1, wherein the information processing operation is at least one of software updating, Bluetooth™ pairing, personalization, operator specific settings, user specific settings, language settings, or voice control settings.

11. An apparatus, comprising:
at least one processor;
at least one memory including computer program code;
the at least one memory and the computer program code configured to, with the at least one processor, cause the apparatus at least to:
receive wireless power in a wireless power receiver and detect receipt of the wireless power in a control interface of the apparatus;
determine to turn on the apparatus in response to detecting the wireless power;
provide wake-up information by the control interface, to a processor in the apparatus, in response to detecting the wireless power;
receive, as a modulated component of the wireless power, instructions for receiving software update information via a wireless communications connection, the modulated component further including a field indicating a wireless communications source for wirelessly downloading the software update information; and
receive the software update information via the wireless communications connection to the wireless communications source indicated in the field of the modulated component of the wireless power, send the software update information through the control interface, and store the received software update information in the apparatus using a software update utility program stored in the apparatus, to cause the processor in the apparatus to receive the software update information while operating on the received wireless power.

12. The apparatus of claim 11, wherein the received power is received from a wireless charging device.

13. The apparatus of claim 11, wherein the received power is received from a near field communication device.

14. The apparatus of claim 11, wherein the information is received as a modulated component of the received power.

15. The apparatus of claim 11, wherein the information is received in a near field communication message received by the wireless power receiver.

16. The apparatus of claim 11, wherein the information is stored in the apparatus.

17. The apparatus of claim 11, wherein the information is stored in the apparatus and receiving wireless power causes the information to be sent through the control interface to cause the information processing operation to be performed.

18. The apparatus of claim 11, further comprising:
the at least one memory and the computer program code configured to, with the at least one processor, cause the apparatus at least to:
receive additional information via a wireless communications connection; and
using the additional information to cause the information processing operation to be performed.

19. The apparatus of claim 11, further comprising:
the at least one memory and the computer program code configured to, with the at least one processor, cause the apparatus at least to:
receive additional information from at least one of a Bluetooth™ connection or a wireless local area network connection; and
using the additional information to cause the information processing operation to be performed.

20. The apparatus of claim 11, wherein the information processing operation is at least one of software updating, Bluetooth™ pairing, personalization, operator specific settings, user specific settings, language settings, or voice control settings.

21. A computer program product comprising computer executable program code recorded on a computer readable non-transitory storage medium, the computer executable program code comprising:
code for receiving wireless power in a wireless power receiver and detecting receipt of the wireless power in a control interface of a device;
code for determining to turn on the device in response to detecting the wireless power;
code for providing wake-up information by the control interface, to a processor in the device, in response to detecting the wireless power;
code for receiving, as a modulated component of the wireless power, instructions for receiving software update information via a wireless communications connection, the modulated component further including a field indicating a wireless communications source for wirelessly downloading the software update information; and
code for receiving the software update information via the wireless communications connection to the wireless communications source indicated in the field of the modulated component of the wireless power, sending the software update information through the control interface, and storing the received software update information in the device using a software update utility program stored in the device, to cause the processor in the device to receive the software update information while operating on the received wireless power.

22. A method, comprising:
receiving wireless power at a wireless power receiver and detecting receipt of the wireless power in a control interface of a device;
providing wake-up information by the control interface, to a processor in the device, in response to detecting the wireless power;
receiving, as a modulated component of the wireless power, instructions for receiving software update information via a wireless communications connection, the modulated component further including a field indicating a wireless communications source for wirelessly downloading the software update information;
receiving the software update information from the wireless power receiver through the control interface, wherein the software update information is received via the wireless communications connection to the wireless communications source indicated in the field of the modulated component of the wireless power;

storing the received software update information in the device using a software update utility program stored in the device; and causing a software update to be performed with the software update information while operating on the received wireless power.

23. The method of claim 22, wherein the wireless power receiver receives power from a wireless charging device.

24. The method of claim 22, wherein the wireless power receiver receives power from a near field communication device.

25. The method of claim 22, wherein the received information is derived from a modulated component of power received by the wireless power receiver.

26. The method of claim 22, wherein the received information is derived from a near field communication message received by the wireless power receiver.

27. The method of claim 22, further comprising:

receiving additional information from a wireless communications connection through a control interface; and causing an information processing operation to be performed using the received additional information.

28. The method of claim 22, further comprising:

receiving additional information from at least one of a Bluetooth™ connection or a wireless local area network connection, through a control interface; and causing an information processing operation to be performed using the received additional information.

29. The method of claim 22, wherein the information processing operation is at least one of software updating, Bluetooth™ pairing, personalization, operator specific settings, user specific settings, language settings, or voice control settings.

30. An apparatus, comprising:

at least one processor;

at least one memory including computer program code;

the at least one memory and the computer program code configured to, with the at least one processor, cause the apparatus at least to:

receive wireless power at a wireless power receiver and detect receipt of the wireless power in a control interface of the apparatus;

provide wake-up information by the control interface, to a processor in the apparatus, in response to detecting the wireless power;

receive, as a modulated component of the wireless power, instructions for receiving software update information via a wireless communications connection, the modulated component further including a field indicating a wireless communications source for wirelessly downloading the software update information;

receive the software update information from the wireless power receiver through the control interface, wherein the software update information is received via the wireless communications connection to the wireless communications source indicated in the field of the modulated component of the wireless power;

store the received software update information in the apparatus using a software update utility program stored in the apparatus; and cause a software update to be performed with the software update information while operating on the received wireless power.

31. The apparatus of claim 30, wherein the wireless power receiver receives power from a wireless charging device.

32. The apparatus of claim 30, wherein the wireless power receiver receives power from a near field communication device.

33. The apparatus of claim 30, wherein the received information is derived from a modulated component of power received by the wireless power receiver.

34. The apparatus of claim 30, wherein the received information is derived from a near field communication message received by the wireless power receiver.

35. The apparatus of claim 30, comprising:

the at least one memory and the computer program code configured to, with the at least one processor, cause the apparatus at least to:

receive additional information from a wireless communications connection; and cause an information processing operation to be performed using the received additional information.

36. The apparatus of claim 30, further comprising:

the at least one memory and the computer program code configured to, with the at least one processor, cause the apparatus at least to:

receive additional information from at least one of a Bluetooth™ connection or a wireless local area network connection; and cause an information processing operation to be performed using the received additional information.

37. The apparatus of claim 35, wherein the information processing operation is at least one of software updating, Bluetooth™ pairing, personalization, operator specific settings, user specific settings, language settings, or voice control settings.

38. A computer program product comprising computer executable program code recorded on a computer readable non-transitory storage medium, the computer executable program code comprising:

code for receiving wireless power at a wireless power receiver and detecting receipt of the wireless power in a control interface of a device;

code for providing wake-up information by the control interface, to a processor in the device, in response to detecting the wireless power;

code for receiving, as a modulated component of the wireless power, instructions for receiving software update information via a wireless communications connection, the modulated component further including a field indicating a wireless communications source for wirelessly downloading the software update information;

code for receiving the software update information from the wireless power receiver through the control interface, wherein the software update information is received via the wireless communications connection to the wireless communications source indicated in the field of the modulated component of the wireless power;

code for storing the received software update information in the device using a software update utility program stored in the device; and code for causing a software update to be performed with the software update information while operating on the received wireless power.

* * * * *